(12) United States Patent
Xu et al.

(10) Patent No.: US 10,708,754 B2
(45) Date of Patent: Jul. 7, 2020

(54) METHOD FOR CONTROLLING DEVICE-TO-DEVICE DISCOVERY AND RELATED DEVICE

(71) Applicant: Huawei Technologies Co., Ltd., Shenzhen (CN)

(72) Inventors: Haibo Xu, Beijing (CN); Jian Wang, Beijing (CN); Hongcheng Zhuang, Shenzhen (CN); Nathan Edward Tenny, Shenzhen (CN); Zhenguo Du, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/343,237

(22) PCT Filed: Oct. 19, 2016

(86) PCT No.: PCT/CN2016/102617
§ 371 (c)(1),
(2) Date: Apr. 18, 2019

(87) PCT Pub. No.: WO2018/072157
PCT Pub. Date: Apr. 26, 2018

(65) Prior Publication Data
US 2019/0253869 A1 Aug. 15, 2019

(51) Int. Cl.
*H04W 8/00* (2009.01)
*H04W 40/02* (2009.01)
(Continued)

(52) U.S. Cl.
CPC ............. *H04W 8/005* (2013.01); *H04W 8/00* (2013.01); *H04W 40/02* (2013.01);
(Continued)

(58) Field of Classification Search
CPC ..... H04W 40/22; H04W 40/24; H04W 8/005; H04W 12/06; H04W 24/08;
(Continued)

(56) References Cited

U.S. PATENT DOCUMENTS 10,171,958 B2 * 1/2019 Wu et al. ................ H04W 4/06
10,212,651 B2 * 2/2019 Gulati et al. .......... H04W 48/17
(Continued)

FOREIGN PATENT DOCUMENTS

CN 104125620 A 10/2014
CN 104812076 A 7/2015
(Continued)

OTHER PUBLICATIONS

Machine Translation and Abstract of Chinese Publication No. CN104812076, dated Jul. 29, 2015, 26 pages.
(Continued)

*Primary Examiner* — Meless N Zewdu
(74) *Attorney, Agent, or Firm* — Conley Rose, P.C.

(57) ABSTRACT

Embodiments of the present invention disclose a method for controlling device-to-device discovery. The method includes: obtaining, by a network device, N first relay function parameter sets of N user equipment supporting a relay function; obtaining, by the network device, a second relay function parameter set of remote user equipment; determining, by the network device for the remote user equipment, at least one of the N user equipment supporting the relay function; and sending, by the network device, a first notification message to the at least one user equipment supporting the relay function, to trigger the at least one user equipment supporting the relay function to initiate a device-to-device discovery process.

20 Claims, 16 Drawing Sheets

(51) Int. Cl.
*H04W 88/18* (2009.01)
*H04W 40/24* (2009.01)
*H04W 88/04* (2009.01)

(52) U.S. Cl.
CPC ......... *H04W 40/246* (2013.01); *H04W 88/18* (2013.01); *H04W 88/04* (2013.01); *Y02D 70/00* (2018.01); *Y02D 70/20* (2018.01); *Y02D 70/21* (2018.01)

(58) Field of Classification Search
CPC . H04W 40/246; H04W 40/248; H04W 88/04; H04W 48/16; H04W 4/70; H04W 28/0247; H04W 8/00; H04W 88/08; H04W 88/00; H04W 88/02; H04W 68/00; H04W 68/005; H04W 68/02; H04W 68/025; H04W 68/04; H04W 68/06; H04W 68/08; H04W 68/10; H04W 4/14; H04W 4/18; H04W 4/185; H04W 4/20; H04W 60/04; H04W 8/08; H04W 40/00; H04W 40/02; H04W 40/005; H04W 40/12; H04W 40/20; H04W 40/32; H04W 40/38; H04W 12/00503; H04W 88/18; H04W 92/18; H04W 4/025; H04W 36/00837; H04W 36/24; Y02D 7/00; Y02D 70/20; Y02D 70/21; Y02D 70/22; Y02D 70/26; Y02D 70/00; Y02D 70/39; Y02D 70/446; H04B 7/026; H04B 7/14
See application file for complete search history.

(56) References Cited

U.S. PATENT DOCUMENTS

| | | | |
|---|---|---|---|
| 2009/0282123 A1* | 11/2009 | Fornari | 709/207 |
| 2012/0011247 A1 | 1/2012 | Mallik et al. | |
| 2012/0239821 A1* | 9/2012 | Hozumi | 709/238 |
| 2013/0331125 A1* | 12/2013 | Dini et al. | H04W 4/023 |
| 2016/0050703 A1* | 2/2016 | Johnsson et al. | H04W 76/023 |
| 2016/0192439 A1 | 6/2016 | Phuyal et al. | |
| 2017/0142594 A1* | 5/2017 | Zhang | H04W 16/14 |
| 2017/0294946 A1* | 10/2017 | Wang et al. | H04B 7/0456 |
| 2017/0325243 A1* | 11/2017 | Yasukawa et al. | H04W 72/0085 |
| 2018/0092017 A1* | 3/2018 | Freda et al. | H04W 36/36 |
| 2018/0098370 A1* | 4/2018 | Bangolae et al. | H04W 76/023 |
| 2018/0110001 A1* | 4/2018 | Yasukawa et al. | H04W 52/0212 |
| 2018/0192458 A1* | 7/2018 | Aminaka et al. | H04W 76/14 |
| 2019/0059094 A1* | 2/2019 | Kaur et al. | H04W 72/121 |

FOREIGN PATENT DOCUMENTS

| | | |
|---|---|---|
| CN | 104902456 A | 9/2015 |
| CN | 105228082 A | 1/2016 |
| EP | 2936922 B1 | 1/2019 |

OTHER PUBLICATIONS

Machine Translation and Abstract of Chinese Publication No. CN104902456, dated Sep. 9, 2015, 25 pages.
Machine Translation and Abstract of Chinese Publication No. CN105228082, dated Jan. 6, 2016, 25 pages.
Huawei, "RAN3 Impact of D2D Discovery Enhancement for inter-PLMN," XP050970319, R3-151079, 3GPP TSG-RAN3 Meeting #88, Fukuoka, Japan, May 25-29, 2015, 6 pages.
Fodor, G., et al., "Design aspects of network assisted device-to-device communications," XP055591088, IEEE Communications Magazine, vol. 50, Issue: 3, Mar. 2012, 8 pages.
Foreign Communication From a Counterpart Application, European Application No. 16919138.4, Extended European Search Report dated Jun. 4, 2019, 13 pages.
Foreign Communication From a Counterpart Application, PCT Application No. PCT/CN2016/102617, English Translation of International Search Report dated Jul. 10, 2017, 2 pages.
Foreign Communication From a Counterpart Application, PCT Application No. PCT/CN2016/102617, English Translation of Written Opinion dated Jul. 10, 2017, 3 pages.

* cited by examiner

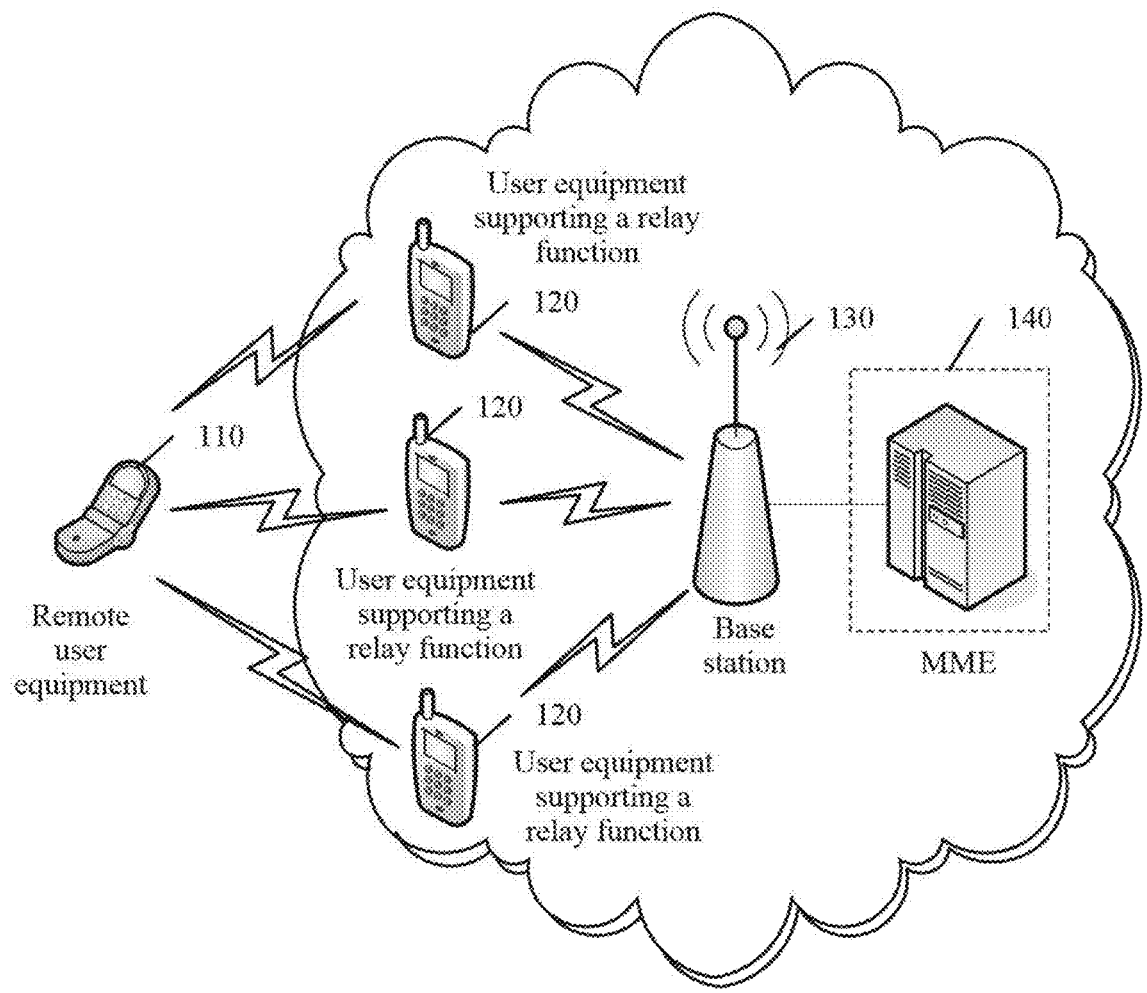
FIG. 1-a

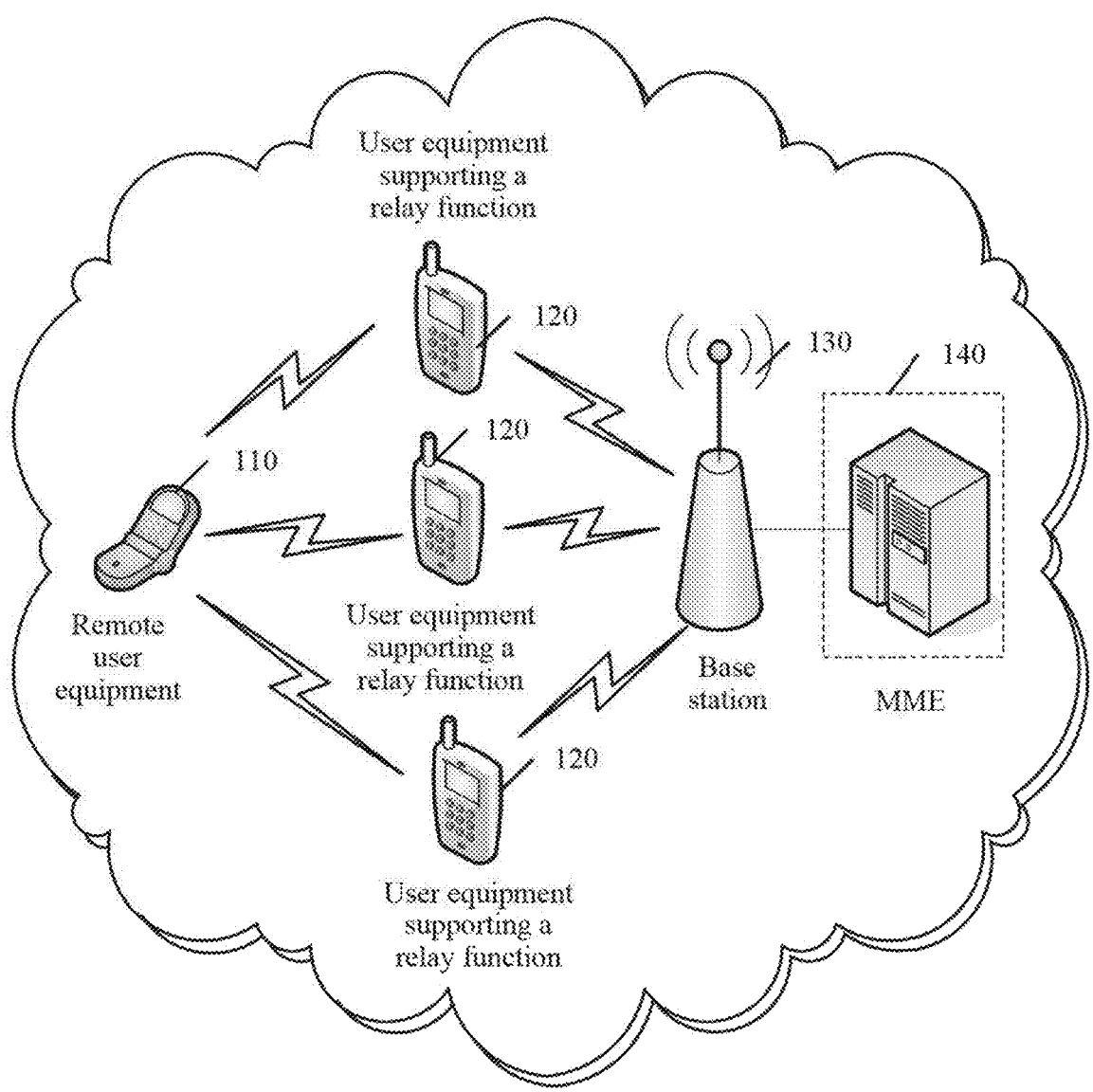
FIG. 1-b

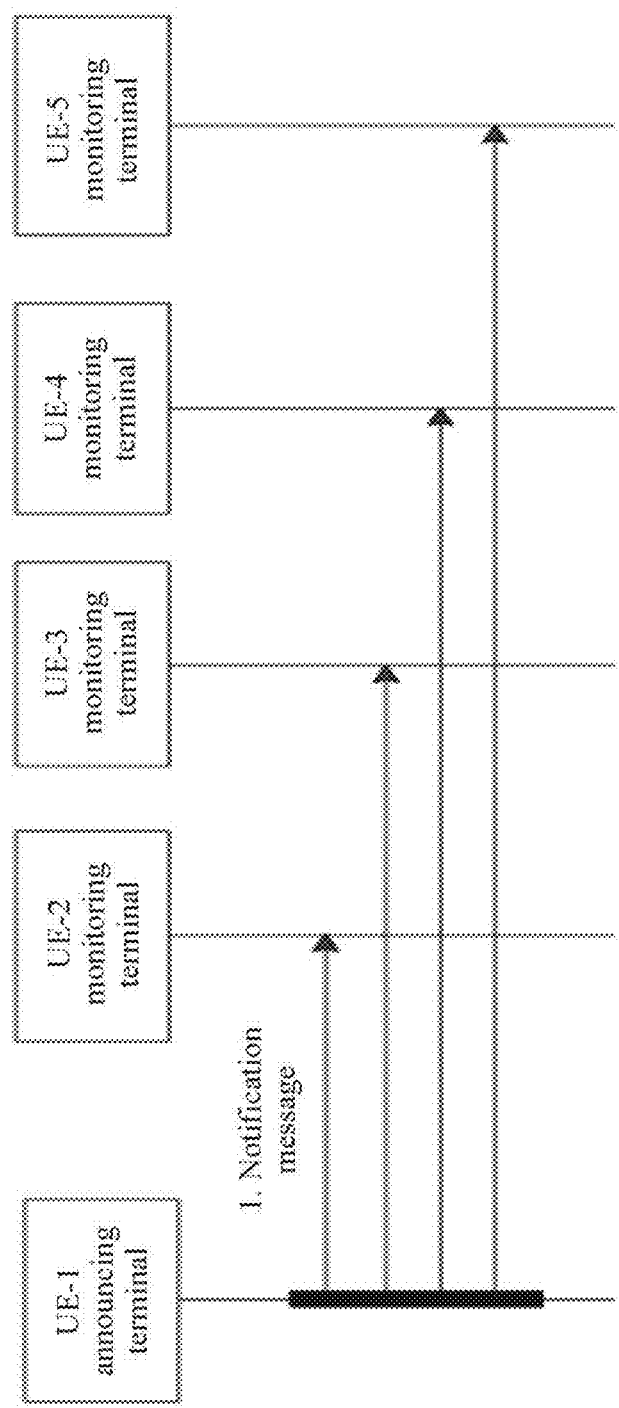
FIG. 2-a

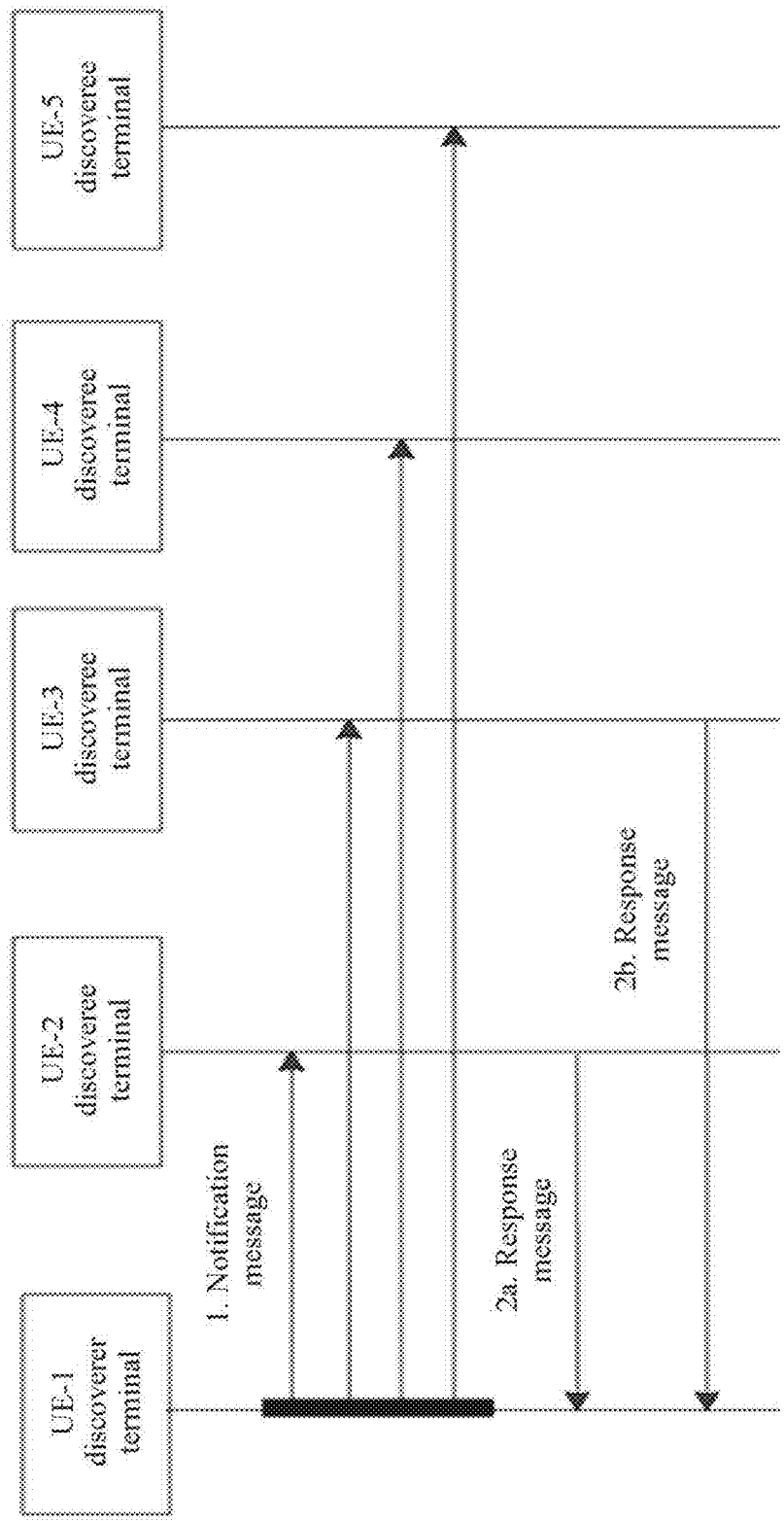
FIG. 2-b

METHOD FOR CONTROLLING DEVICE-TO-DEVICE DISCOVERY AND RELATED DEVICE

CROSS-REFERENCE TO RELATED APPLICATIONS

This application is a National Stage of International Application No. PCT/CN2016/102617, filed on Oct. 19, 2016, which is hereby incorporated by reference in its entirety.

TECHNICAL FIELD

The present invention relates to the field of communications technologies, and specifically, to a method for controlling device-to-device discovery and a related device.

BACKGROUND

A device-to-device (D2D) communication mode is a communication mode in which a transmit end directly sends data to a receive end without forwarding by a base station or a cellular network. A special mode in the D2D communication mode is that user equipment (for example, remote user equipment, Remote UE) connects to a network by using another user equipment (relay device, Relay UE) having a relay function. In this mode of connecting to the network by using the relay device, the remote user equipment can smoothly access the network even if the remote user equipment is not within coverage of the network, and power consumption of the remote user equipment during the access can be reduced.

Before the remote user equipment accesses the network by using the relay device, the remote user equipment needs to first discover user equipment that may provide relay support for the remote user equipment. Currently, the user equipment supporting the relay function starts to perform a discovery process only after the user equipment obtains a resource configured by a base station and used for sending or receiving a discovery message and a Uu interface channel quality condition configured by the base station is satisfied. However, in this case, possibly the user equipment performing the discovery process cannot satisfy a relay requirement of the remote user equipment, and therefore the user equipment cannot be used by the remote user equipment. In this case, the discovery process performed by the user equipment is a futile discovery process. Consequently, unnecessary power consumption is caused.

SUMMARY

Embodiments of the present invention provide a method for controlling device-to-device discovery and a related device, to reduce a futile discovery process.

According to a first aspect, an embodiment of the present invention provides a method for controlling device-to-device discovery, where the method includes: obtaining, by a network device, N first relay function parameter sets of N user equipment supporting a relay function, where the N first relay function parameter sets correspond to the N user equipment supporting the relay function, and N is a positive integer; then obtaining, by the network device, a second relay function parameter set of remote user equipment; then determining, by the network device for the remote user equipment, at least one of the N user equipment supporting the relay function, where a first relay function parameter set of the at least one user equipment supporting the relay function and the second relay function parameter set satisfy a preset matching relationship; and finally sending, by the network device, a first notification message to the at least one user equipment supporting the relay function, where the first notification message is used to trigger the at least one user equipment supporting the relay function to initiate a device-to-device discovery process.

In the solution provided by this embodiment of the present invention, the network device determines at least one of the N user equipment supporting the relay function, and the network device triggers only the determined at least one user equipment supporting the relay function to initiate the device-to-device discovery process. Therefore, unnecessary power consumption for initiating the discovery process by user equipment that supports the relay function but does not satisfy a discovery function requirement of the remote user equipment is reduced.

Further, some of the N user equipment supporting the relay function are first determined. Therefore, when a discovery requirement of the remote user equipment is notified during execution of the discovery process, resource consumption in a notification process can be reduced, and a process of mutual discovery by the remote user equipment and the user equipment supporting the relay function can be accelerated. For example, when a carrier frequency intended for discovery is notified to the user equipment supporting the relay function, the user equipment supporting the relay function may send or receive a discovery message only on the carrier frequency without trying a plurality of carrier frequencies.

In a possible design, the network device includes a base station or a mobility management entity (MME). In this embodiment of the present invention, different network device entities may be used to determine at least one of the N user equipment supporting the relay function, so that the method for controlling device-to-device discovery is more flexible.

In a possible design, if the network device includes the base station, the obtaining, by a network device, N first relay function parameter sets of N user equipment supporting a relay function includes: receiving, by the base station, a second notification message sent by the MME, where the second notification message includes the N first relay function parameter sets and user equipment identities of the N user equipment supporting the relay function.

In a possible design, if the network device includes the base station, the obtaining, by a network device, N first relay function parameter sets of N user equipment supporting a relay function includes: sending, by the base station, a first request message to the MME, where the first request message includes the second relay function parameter set; and then receiving, by the base station, a first request feedback message sent by the MME in response to the first request message, where the first request feedback message includes the N first relay function parameter sets and user identities of the N user equipment supporting the relay function.

The MME obtains and stores the N first relay function parameter sets of the N user equipment supporting the relay function, and then the base station actively or passively obtains the N first relay function parameter sets from the MME. Therefore, power consumption of the base station can be reduced, and a manner of obtaining the N first relay function parameter sets is more flexible.

In a possible design, the obtaining, by the network device, a second relay function parameter set of remote user equipment includes: obtaining, by the network device, the second relay function parameter set of the remote user equipment from the remote user equipment.

In a possible design, if the network device is the base station, the obtaining, by the network device, a second relay function parameter set of remote user equipment includes: receiving, by the base station, a second request message sent by the remote user equipment, where the second request message includes the second relay function parameter set.

In a possible design, if the network device is the MME, the obtaining, by the network device, a second relay function parameter set of remote user equipment includes: receiving, by the MME, a third request message sent by the remote user equipment, where the third request message includes the second relay function parameter set.

In a possible design, the first relay function parameter set includes at least one of the following relay function parameters: a remote user equipment association identifier supported by the user equipment supporting the relay function, a device-to-device connection access mode supported by the user equipment supporting the relay function, and a discovery mechanism of the discovery process that is supported by the user equipment supporting the relay function.

In a possible design, the second relay function parameter set includes at least one of the following relay function parameters: the remote user equipment association identifier supported by the user equipment supporting the relay function, a device-to-device connection access mode currently selected by the remote user equipment, and a discovery mechanism of the discovery process that is selected by the remote user equipment.

Because the first relay function parameter set includes some function requirement parameters related to the relay function of the user equipment supporting the relay function, and the second relay function parameter set includes some function requirement parameters of the remote user equipment that are related to the relay function, when the first relay function parameter is matched with the second function parameter set of the remote equipment to determine the N user equipment supporting the relay function, user equipment supporting the relay function and satisfying the requirement can be selected based on a situation.

In a possible design, the method further includes: obtaining, by the network device, a third relay function parameter set of the remote user equipment; and then incorporating, by the network device, the third relay function parameter set into the second relay function parameter set to update the second relay function parameter set and obtain a new second relay function parameter set, where the first relay function parameter set of the at least one user equipment supporting the relay function includes the new second relay function parameter set.

In a possible design, the third relay function parameter set includes at least one of the following function parameters: a public land mobile network (PLMN) identity currently selected by the remote user equipment and a current serving frequency of the remote user equipment.

The network device further determines a function requirement parameter related to the relay function of the remote user equipment, so that user equipment supporting the relay function and satisfying the requirement can be matched more accurately.

In a possible design, the first notification message includes at least one of the following parameters: instruction information used to initiate the discovery process, the device-to-device connection access mode, a carrier frequency for sending and/or receiving a discovery message in the discovery process, the discovery mechanism of the discovery process, and a sending and/or receiving resource pool used for sending and/or receiving the discovery message in the discovery process. The first notification message includes the parameter and the instruction information of the discovery process, so that the user equipment supporting the relay function can initiate the discovery process based on the first notification message after receiving the first notification message.

In a possible design, if the network device is the MME, the sending, by the network device, a first notification message to the at least one user equipment supporting the relay function includes: sending, by the MME, a third notification message to the base station, where the third notification message is used to instruct the base station to send the first notification message to the at least one user equipment supporting the relay function.

In a possible design, the third notification message includes at least one of the following parameters: a user equipment identity of the at least one user equipment supporting the relay function, the instruction information used to initiate the discovery process, the device-to-device connection access mode, the carrier frequency for sending and/or receiving the discovery message in the discovery process, the discovery mechanism of the discovery process, and the sending and/or receiving resource pool used for sending and/or receiving the discovery message in the discovery process. After the MME determines the at least one user equipment supporting the relay function, the MME needs to send the first notification message by using the base station, to notify the at least one user equipment supporting the relay function. Therefore, the MME may send the third notification message to the base station to instruct the base station to send the first notification message.

In a possible design, the method further includes: after the base station determines that one of the at least one user equipment supporting the relay function is connected to the remote user equipment, sending, by the base station, a fourth notification message to another user equipment supporting the relay function in the at least one user equipment supporting the relay function different from the one user equipment supporting the relay function, where the fourth notification message is used to instruct the another user equipment supporting the relay function to stop the discovery process.

In a possible design, the fourth notification message includes at least one of the following parameters: the remote user equipment association identifier supported by the user equipment supporting the relay function and instruction information used to stop the discovery process. The fourth notification message is sent to the user equipment supporting the relay function to stop the discovery process. Therefore, after the remote user equipment has successfully established a connection to one user equipment supporting the relay function, other user equipment supporting the relay function are allowed to stop the discovery process in time to reduce unnecessary power consumption.

In a possible design, if the user equipment supporting the relay function is in a connected state, the first notification message is a dedicated control message.

In a possible design, if the user equipment supporting the relay function is in a connected state, the fourth notification message includes a dedicated control message.

It may be understood that, when the user equipment supporting the relay function is in the connected state, the fourth notification message is sent by using the dedicated control message, so that efficiency of sending the message is higher.

In a possible design, if the user equipment supporting the relay function is in an idle state or a connected state, the first notification message is a paging message.

In a possible design, if the user equipment supporting the relay function is in an idle state or a connected state, the fourth notification message includes a paging message.

In a possible design, if the first notification message is the paging message, the first notification message further includes the user equipment identity of the at least one user equipment supporting the relay function.

In a possible design, the first notification message includes a time identifier, and the time identifier is used to instruct the at least one user equipment supporting the relay function to stop the discovery process after a preset time period corresponding to the time identifier elapses after the first notification message is received.

It may be understood that, the first notification message includes the time identifier used to control the user equipment supporting the relay function to stop the discovery process. Therefore, control of the discovery process is more flexible, and other user equipment supporting the relay function are allowed to stop the discovery process in time to reduce unnecessary power consumption.

According to a second aspect, an embodiment of the present invention provides a method for controlling device-to-device discovery, where the method includes: receiving, by user equipment, a first notification message sent by a network device, where the first notification message is used to trigger at least one user equipment supporting a relay function to initiate a device-to-device discovery process, the at least one user equipment supporting the relay function is determined by the network device from N user equipment supporting the relay function, and the user equipment supports the relay function; and initiating, by the user equipment, the discovery process based on the first notification message.

In the solution provided by this embodiment of the present invention, the network device determines at least one of the N user equipment supporting the relay function, and the network device triggers only the determined at least one user equipment supporting the relay function to initiate the device-to-device discovery process. Therefore, unnecessary power consumption for initiating the discovery process by user equipment that supports the relay function but does not satisfy a discovery function requirement of remote user equipment is reduced.

Further, some of the N user equipment supporting the relay function are first determined. Therefore, when a discovery requirement of the remote user equipment is notified during execution of the discovery process, resource consumption in a notification process can be reduced, and a process of mutual discovery by the remote user equipment and the user equipment supporting the relay function can be accelerated. For example, when a carrier frequency intended for discovery is notified to the user equipment supporting the relay function, the user equipment supporting the relay function may send or receive a discovery message only on the carrier frequency without trying a plurality of carrier frequencies.

In a possible design, if the first notification message includes a paging message, the initiating, by the user equipment, the discovery process based on the first notification message includes: receiving, by the user equipment, the paging message at a preset monitoring time; and if the first notification message includes a user equipment identity of the user equipment, initiating, by the user equipment, the discovery process based on the first notification message.

When the user equipment supporting the relay function is in different states, using different notification messages can better satisfy communication requirements. In addition, the user equipment that supports the relay function and is in a connected state can be notified by using a dedicated control message, and therefore notification efficiency is higher.

According to a third aspect, an embodiment of the present invention provides a method for controlling device-to-device discovery, where the method includes: receiving, by user equipment, a notification message sent by a network device, where the user equipment supports a relay function, the notification message is used to trigger the user equipment to initiate a device-to-device discovery process, and the notification message includes a communication parameter set for initiating the device-to-device discovery process by the user equipment; and if a relay function parameter set of the user equipment and the communication parameter set satisfy a preset matching relationship, initiating, by the user equipment, the device-to-device discovery process.

In the solution provided by this embodiment of the present invention, when the relay function parameter set of the user equipment supporting the relay function and the communication parameter set for initiating the device-to-device discovery process by the user equipment satisfy the preset matching relationship, the user equipment initiates the discovery process. Therefore, unnecessary power consumption for initiating the discovery process by user equipment that supports the relay function but does not satisfy a discovery function requirement of remote user equipment is reduced.

Further, only some user equipment supporting the relay function perform the discovery process. Therefore, when a discovery requirement of the remote user equipment is notified, resource consumption in a notification process can be reduced, and a process of mutual discovery by the remote user equipment and the user equipment supporting the relay function can be accelerated. For example, when a carrier frequency intended for discovery is notified to the user equipment supporting the relay function, the user equipment supporting the relay function may send or receive a discovery message only on the carrier frequency without trying a plurality of carrier frequencies.

In a possible design, the network device includes a base station.

In a possible design, the communication parameter set includes at least one of the following parameters: instruction information used to initiate the discovery process, the device-to-device connection access mode, a public land mobile network (PLMN) identity in the discovery process, a carrier frequency for sending and/or receiving a discovery message in the discovery process, a discovery mechanism of the discovery process, and a sending and/or receiving resource pool used for sending and/or receiving the discovery message in the discovery process.

In a possible design, the relay function parameter set includes at least one of the following parameters: a remote user equipment association identifier supported by the user equipment supporting the relay function, a device-to-device connection access mode supported by the user equipment supporting the relay function, a public land mobile network (PLMN) identity supported by the user equipment supporting the relay function, a carrier frequency supported by the user equipment supporting the relay function, and a discovery mechanism of the device-to-device discovery process that is supported by the user equipment supporting the relay function. The communication parameter set includes a requirement parameter related to the discovery process, and then based on the requirement parameter, the communication parameter set is matched with the relay function parameter set to search for user equipment that supports the relay function and satisfies the requirement. Therefore, the user equipment that supports the relay function and satisfies the requirement can be selected, and unnecessary power consumption for initiating the discovery process by the user equipment that supports the relay function but does not satisfy the discovery function requirement of the remote user equipment is further reduced.

In a possible design, the notification message includes a paging message, and if the relay function parameter set of the user equipment and the communication parameter set satisfy the preset matching relationship, before the initiating, by the user equipment, the device-to-device discovery process, the method further includes: receiving, by the user equipment, the paging message at a preset monitoring time.

According to a fourth aspect, an embodiment of the present invention provides a method for controlling device-to-device discovery, where the method includes: obtaining, by a network device, a second relay function parameter set of remote user equipment; and then sending, by the network device, a notification message to user equipment, where the user equipment supports a relay function, the notification message is used to trigger the user equipment to initiate a device-to-device discovery process, the notification message includes a communication parameter set for initiating the device-to-device discovery process by the user equipment, and the communication parameter set is determined based on the second relay function parameter set.

In the solution provided by this embodiment of the present invention, when a relay function parameter set of the user equipment supporting the relay function and the communication parameter set for initiating the device-to-device discovery process by the user equipment satisfy a preset matching relationship, the user equipment initiates the discovery process. Therefore, unnecessary power consumption for initiating the discovery process by user equipment that supports the relay function but does not satisfy a discovery function requirement of the remote user equipment is reduced.

Further, only some user equipment supporting the relay function perform the discovery process. Therefore, when a discovery requirement of the remote user equipment is notified, resource consumption in a notification process can be reduced, and a process of mutual discovery by the remote user equipment and the user equipment supporting the relay function can be accelerated. For example, when a carrier frequency intended for discovery is notified to the user equipment supporting the relay function, the user equipment supporting the relay function may send or receive a discovery message only on the carrier frequency without trying a plurality of carrier frequencies.

In a possible design, the network device includes a base station.

In a possible design, the method further includes: obtaining, by the network device, a third relay function parameter set of the remote user equipment; and incorporating, by the network device, the third relay function parameter set into the second relay function parameter set to update the second relay function parameter set and obtain a new second relay function parameter set, where a first relay function parameter set of at least one user equipment supporting the relay function includes the new second relay function parameter set. The network device further determines a function requirement parameter related to the relay function of the remote user equipment, so that user equipment supporting the relay function and satisfying the requirement can be matched more accurately.

In a possible design, the communication parameter set includes at least one of the following parameters: instruction information used to initiate the discovery process, the device-to-device connection access mode, a public land mobile network (PLMN) identity in the discovery process, a carrier frequency for sending and/or receiving a discovery message in the discovery process, a discovery mechanism of the discovery process, and a sending and/or receiving resource pool used for sending and/or receiving the discovery message in the discovery process. The communication parameter set includes a requirement parameter related to the discovery process, and then based on the requirement parameter, the communication parameter set is matched with the relay function parameter set to search for user equipment that supports the relay function and satisfies the requirement. Therefore, the user equipment that supports the relay function and satisfies the requirement can be selected, and unnecessary power consumption for initiating the discovery process by the user equipment that supports the relay function but does not satisfy the discovery function requirement of the remote user equipment is further reduced.

In a possible design, the notification message includes a paging message.

According to a fifth aspect, an embodiment of the present invention provides a network device, where the network device has a function for implementing the first aspect. The function may be implemented by hardware, or may be implemented by corresponding software executed by hardware. The hardware or software includes one or more modules corresponding to the foregoing function.

In a possible design, the network device may be a base station or an MME, or may be another network node, for example, a GPRS support node, a network entity at a non-access stratum, or a network entity at a radio resource control layer.

In a possible design, when the network device is a base station, a structure of the base station includes a processor, a transmitter, and a receiver, and the processor is configured to support the base station in performing a corresponding function in the foregoing method. The transmitter and the receiver are configured to support communication between the base station and user equipment and communication between the base station and an MME. Further, the base station may further include a memory. The memory is coupled to the processor. The memory stores a program instruction and data required by the base station.

In a possible design, when the network device is an MME, a structure of the MME includes a processor, a transmitter, and a receiver, and the processor is configured to support the MME in performing a corresponding function in the foregoing method. The transmitter and the receiver are configured to support communication between the MME and user equipment and communication between the MME and a base station. Further, the MME may further include a memory. The memory is coupled to the processor. The memory stores a program instruction and data required by the base station.

According to a sixth aspect, an embodiment of the present invention provides user equipment, where the user equipment has a function for implementing the second aspect. The function may be implemented by hardware, or may be implemented by corresponding software executed by hardware. The hardware or software includes one or more modules corresponding to the foregoing function.

In a possible design, the user equipment includes a processor, a receiver, and a transmitter, where the processor is configured to support the user equipment in performing a corresponding function in the foregoing method. The receiver and the transmitter are configured to support communication between the user equipment and a network device. Further, the user equipment may further include a memory. The memory is coupled to the processor. The memory stores a program instruction and data required by the user equipment.

According to a seventh aspect, an embodiment of the present invention provides user equipment, where the user equipment has a function for implementing the third aspect. The function may be implemented by hardware, or may be implemented by corresponding software executed by hardware. The hardware or software includes one or more modules corresponding to the foregoing function.

In a possible design, the user equipment includes a processor, a receiver, and a transmitter, where the processor is configured to support the user equipment in performing a corresponding function in the foregoing method. The receiver and the transmitter are configured to support communication between the user equipment and a network device. Further, the user equipment may further include a memory. The memory is coupled to the processor. The memory stores a program instruction and data required by the user equipment.

According to an eighth aspect, an embodiment of the present invention provides a network device, where the network device has a function for implementing the fourth aspect. The function may be implemented by hardware, or may be implemented by corresponding software executed by hardware. The hardware or software includes one or more modules corresponding to the foregoing function.

In a possible design, the network device may be a base station or an MME, or may be another network node, for example, a GPRS support node, a network entity at a non-access stratum, or a network entity at a radio resource control layer.

In a possible design, when the network device is a base station, a structure of the base station includes a processor, a transmitter, and a receiver, and the processor is configured to support the base station in performing a corresponding function in the foregoing method. The transmitter and the receiver are configured to support communication between the base station and user equipment. Further, the base station may further include a memory. The memory is coupled to the processor. The memory stores a program instruction and data required by the base station.

In a possible design, when the network device is an MME, a structure of the MME includes a processor, a transmitter, and a receiver, and the processor is configured to support the MME in performing a corresponding function in the foregoing method. The transmitter and the receiver are configured to support communication between the MME and user equipment and communication between the MME and a base station. Further, the MME may further include a memory. The memory is coupled to the processor. The memory stores a program instruction and data required by the base station.

According to a ninth aspect, an embodiment of the present invention provides a computer storage medium, configured to store a computer software instruction used by the network device in the foregoing fifth aspect, where the computer software instruction includes a program designed for executing the foregoing aspect.

According to a tenth aspect, an embodiment of the present invention provides a computer storage medium, configured to store a computer software instruction used by the user equipment in the foregoing sixth aspect, where the computer software instruction includes a program designed for executing the foregoing aspect.

According to an eleventh aspect, an embodiment of the present invention provides a computer storage medium, configured to store a computer software instruction used by the user equipment in the foregoing seventh aspect, where the computer software instruction includes a program designed for executing the foregoing aspect.

According to a twelfth aspect, an embodiment of the present invention provides a computer storage medium, configured to store a computer software instruction used by the network device in the foregoing eighth aspect, where the computer software instruction includes a program designed for executing the foregoing aspect.

In comparison with the prior art, in the solutions provided by the embodiments of the present invention, the network device determines at least one of the N user equipment supporting the relay function, and the network device triggers only the determined at least one user equipment supporting the relay function to initiate the device-to-device discovery process. Therefore, unnecessary power consumption for initiating the discovery process by the user equipment that supports the relay function but does not satisfy the discovery function requirement of the remote user equipment is reduced.

Further, some of the N user equipment supporting the relay function are first determined. Therefore, when the discovery requirement of the remote user equipment is notified during execution of the discovery process, resource consumption in the notification process can be reduced, and the process of mutual discovery by the remote user equipment and the user equipment supporting the relay function can be accelerated. For example, when a carrier frequency intended for discovery is notified to the user equipment supporting the relay function, the user equipment supporting the relay function may send or receive a discovery message only on the carrier frequency without trying a plurality of carrier frequencies.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 1-a is a network architecture diagram of a system for controlling device-to-device discovery according to an embodiment of the present invention;

FIG. 1-b is a network architecture diagram of another system for controlling device-to-device discovery according to an embodiment of the present invention;

FIG. 2-a is a schematic diagram of a device-to-device discovery mechanism according to an embodiment of the present invention;

FIG. 2-b is a schematic diagram of another device-to-device discovery mechanism according to an embodiment of the present invention;

DESCRIPTION OF EMBODIMENTS

Figure 3:
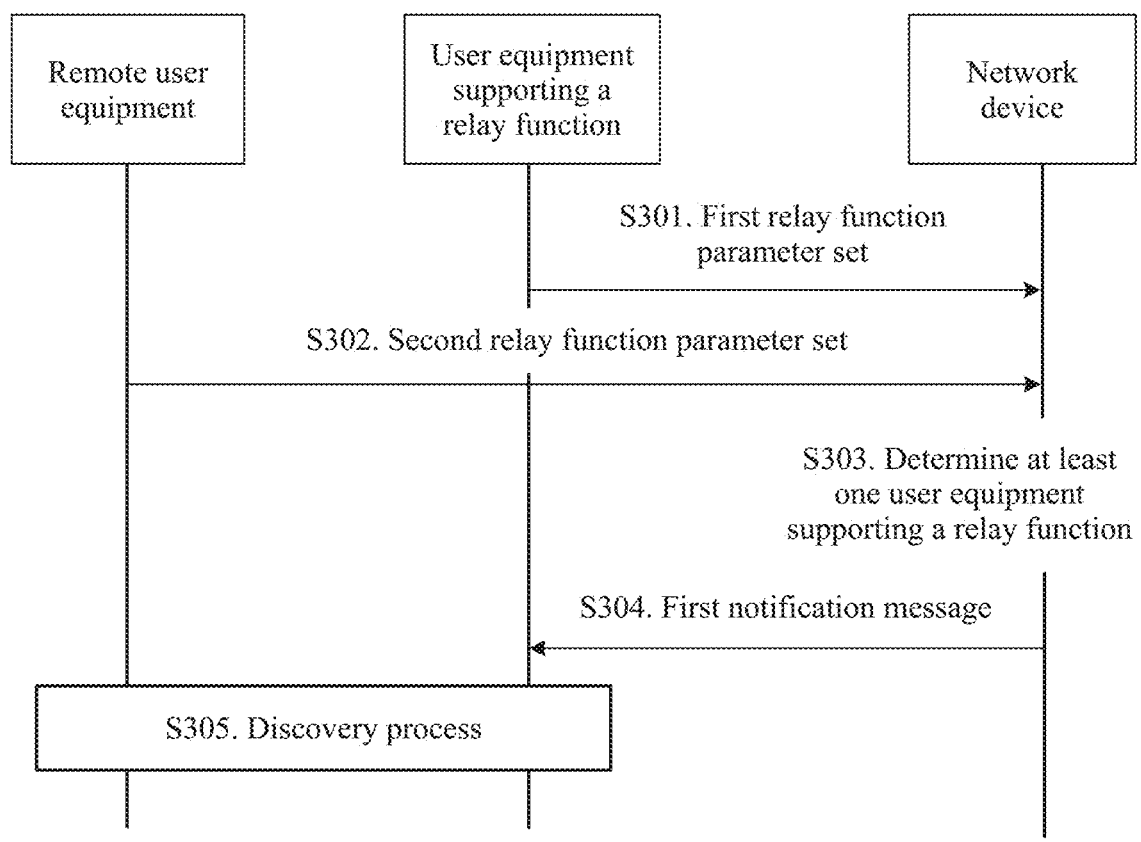
FIG. 3 is a schematic flowchart of an embodiment of a method for controlling device-to-device discovery according to an embodiment of the present invention.

Embodiments of the present invention provide a method for controlling device-to-device discovery and a related device, to reduce a futile discovery process.

To make persons skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall in the protection scope of the present invention.

In the specification, claims, and accompanying drawings of the present invention, the terms "first", "second", "third", and so on are intended to distinguish between different objects but do not indicate a particular order. Moreover, the term "including" and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

"An embodiment" mentioned in the specification indicates that a particular characteristic, structure or property that is related to the embodiment may be included in at least one embodiment of the present invention. The phase occurring at different locations in the specification does not necessarily refer to a same embodiment, or an independent or alternative embodiment exclusive of another embodiment. Persons skilled in the art understand, in explicit and implicit manners, that an embodiment described in this application may be combined with another embodiment.

FIG. 1-a is a network architecture diagram of a system for controlling device-to-device discovery according to an embodiment of the present invention. FIG. 1-b is a network architecture diagram of another system for controlling device-to-device discovery according to an embodiment of the present invention. A method for controlling device-to-device discovery according to an embodiment of the present invention may be performed based on the two network architecture diagrams. The foregoing network architecture diagram includes remote user equipment 110, at least one user equipment 120 supporting a relay function, and a base station 130, and optionally may further include a mobility management entity (MME) 140. In this embodiment of the present invention, the base station 130 and the MME 140 may be collectively referred to as a network-device. In other embodiments, the network device may be used to denote the base station 130, and in other embodiments, the network device may be used to denote the MME 140.

In the network architecture diagram shown in FIG. 1-a, the remote user equipment 110 may be relatively far away from the base station 130 and is beyond network coverage of the base station 130, and therefore cannot directly establish a communication connection to the base station 130. However, a connection may be directly established between the remote user equipment 110 and the user equipment 120 supporting the relay function. For example, by using Bluetooth low energy (BLE) or a wireless technology Wi-Fi, a connection may be established between the remote user equipment 110 and the user equipment 120 supporting the relay function. Therefore, the remote user equipment 110 may establish an access network connection to the base station 130 by using the user equipment 120 supporting the relay function, for uplink or downlink data transmission.

In the network architecture diagram shown in FIG. 1-a, the remote user equipment 110 may be relatively far away from the base station 130 and is beyond network coverage of the base station 130, and therefore cannot directly establish a communication connection to the base station 130. However, a connection may be directly established between the remote user equipment 110 and the user equipment 120 supporting the relay function. For example, by using Bluetooth low energy (Bluetooth low energy, BLE for short) or a wireless technology Wi-Fi, a connection may be established between the remote user equipment 110 and the user equipment 120 supporting the relay function. Therefore, the remote user equipment 110 may establish an access network connection to the base station 130 by using the user equipment 120 supporting the relay function, for uplink or downlink data transmission.

In the network architecture shown in FIG. 1-b, different from FIG. 1-a, the remote user equipment 110 is within network coverage of the network device, that is, the remote user equipment 110 may directly establish a network communication connection to the base station 130. However, when the remote user equipment 110 directly accesses a network service provided by the base station 130, relatively high transmit power is required. Because the remote user equipment 110 is generally a small wearable device with a relatively small battery capacity and low power consumption, an operation of the remote user equipment 110 needs to be of low power consumption. When the remote user equipment 110 communicates with the relay device 120, required transmit power is relatively low. Therefore, to save power of the remote user equipment 110, in the second network architecture, the remote user equipment 110 may establish an access network connection to the base station 130 by using the relay device 120, for uplink or downlink data transmission.

Specifically, the remote user equipment 110 may be user equipment (UE) such as a mobile phone or a wearable device (WE). The user equipment 120 supporting the relay function may also be user equipment such as a mobile phone or a wearable device. The base station 130 may be an evolved NodeB (eNodeB), and is configured to provide a network access resource for the remote user equipment or the user equipment 120 supporting the relay function. The MME may be configured to store information about the user equipment 120 supporting the relay function.

Preferably, this embodiment of the present invention is mainly used in an application scenario in which the remote user equipment 110 is a wearable device and the user equipment 120 supporting the relay function is a mobile phone.

In this embodiment of the present invention, to enable the remote user equipment 110 to establish a connection to the base station 130 by using the user equipment 120 supporting the relay function, the remote user equipment 110 first needs to discover user equipment that may provide relay support for the remote user equipment 110, where the process is a device-to-device discovery process. Currently, the 3rd Generation Partnership Project (3GPP) defines two discovery mechanisms supporting device-to-device discovery, referred to as a model A and a model B respectively. FIG. 2-a is a schematic diagram of a device-to-device discovery mechanism according to an embodiment of the present invention. FIG. 2-b is a schematic diagram of another device-to-device discovery mechanism according to an embodiment of the present invention. FIG. 2-a and FIG. 2-b correspond to the model A and model B respectively.

In the discovery mechanism shown in FIG. 2-a, user equipment supporting a relay function broadcasts a discovery message in a preset period. If another remote user equipment is monitoring the discovery message in this case, the another remote user equipment discovers the user equipment supporting the relay function. In this model, the user equipment sending the notification message discovery message is referred to as an announcing terminal announcing UE, and the user equipment receiving the discovery message is referred to as a monitoring terminal monitoring UE.

In the discovery mechanism shown in FIG. 2-b, if one user equipment wants to discover nearby user equipment, the user equipment actively sends a solicitation message. If another user equipment is monitoring the message, after receiving the solicitation message, the another user equipment sends a response message to the user equipment sending the solicitation message. In this model, the user equipment sending the solicitation message is referred to as a discoverer terminal discoverer UE, and the user equipment sending the response message is referred to as a discoveree terminal discoveree UE.

In this embodiment of the present invention, a condition in which the user equipment supporting the relay function can send the discovery message is controlled by a base station. On one hand, the base station controls a resource used by the user equipment supporting the relay function to send the discovery message. On the other hand, the base station controls a Uu interface channel condition that needs to be satisfied for the user equipment supporting the relay function to send the discovery message. A specific method is as follows:

The base station may select to broadcast a threshold of one or two Uu interface channel conditions. One is lowest Uu interface channel quality that needs to be satisfied for sending the discovery message. The other is highest Uu interface channel quality that needs to be satisfied for sending the discovery message.

For user equipment that is in an RRC_IDLE state and supports the relay function, if the base station broadcasts a resource pool used for sending the discovery message, when Uu interface channel quality of the user equipment supporting the relay function satisfies the foregoing channel quality condition, the user equipment supporting the relay function may start to send the discovery message; or when Uu interface channel quality of the user equipment supporting the relay function does not satisfy the foregoing channel quality condition any longer, the user equipment supporting the relay function stops sending the discovery message.

For UE that is in an RRC_CONNECTED state, when Uu interface channel quality of the user equipment supporting the relay function satisfies the foregoing channel quality condition, the user equipment supporting the relay function first needs to send an instruction requesting to start a discovery process to the base station. After receiving a resource that is allocated by the base station and used to send the discovery message, the user equipment supporting the relay function may start to send the discovery message.

However, because the remote user equipment and the user equipment supporting the relay function can send and receive a discovery message only on a preconfigured carrier frequency, if the user equipment supporting the relay function is not selected based on a requirement of the remote user equipment in this case, a serving frequency of the user equipment that supports the relay function and sends the discovery message may not satisfy the requirement of the remote user equipment, or a discovery time and a discovery mechanism of the user equipment supporting the relay function may not satisfy the requirement of the remote user equipment. In the technical solution provided by this embodiment of the present invention, the user equipment supporting the relay function may be controlled, based on the requirement of the remote user equipment, when to perform sending discovery message or stop the discovery process, to avoid unnecessary power consumption.

FIG. 3 is a schematic flowchart of an embodiment of a method for controlling device-to-device discovery according to an embodiment of the present invention. As shown in FIG. 3, the method may include the following steps.

S301. A network device obtains N first relay function parameter sets of N user equipment supporting a relay function, where the N first relay function parameter sets correspond to the N user equipment supporting the relay function, and N is a positive integer.

In this embodiment of the present invention, the N user equipment supporting the relay function exist in network space during execution of a device-to-device discovery process, and at least one of the N user equipment supporting the relay function possibly cannot satisfy a requirement of remote user equipment in the discovery process.

Optionally, the network device includes a base station or an MME.

Optionally, the user equipment supporting the relay function may be in a connected state ECM_CONNECTED or an idle state ECM_IDLE.

The first relay function parameter set is context information related to the relay function of the user equipment supporting the relay function and supported by the user equipment supporting the relay function.

Optionally, in an embodiment of the present invention, the first relay function parameter set includes at least one of the following relay function parameters:

a remote user equipment association identifier supported by the user equipment supporting the relay function, a device-to-device connection access mode supported by the user equipment supporting the relay function, and a discovery mechanism of the discovery process that is supported by the user equipment supporting the relay function.

Specifically, in an example of the present invention, the remote user equipment association identifier supported by the user equipment supporting the relay function may be, for example, identification information (ID) of the remote user equipment supported by the user equipment supporting the relay function, or an identifier that is in another form and is used to associate the user equipment supporting the relay function and the remote user equipment for which the user equipment can provide a relay service.

Specifically, the device-to-device connection access mode includes but is not limited to communication over a wireless local area network (WLAN), Bluetooth communication, and communication based on a sidelink in a Long Term Evolution (LTE) system.

Specifically, the discovery mechanism includes a model A or a model B.

It should be noted that, in this embodiment of the present invention, the first relay function parameter set includes a relay function parameter supported by all user equipment supporting the relay function, and there may be one or more relay function parameters. For example, if the remote user equipment association identifier supported by the user equipment supporting the relay function is an ID of the remote user equipment, the first relay function parameter set includes a remote user ID supported by all the user equipment supporting the relay function, for example, an ID 1 or an ID 2. Likewise, the device-to-device connection access mode supported by the user equipment supporting the relay function includes an access mode A, an access mode B, or the like supported by the user equipment supporting the relay function. The discovery mechanism of the discovery process supported by the user equipment supporting the relay function may include the model A and the model B.

S302. The network device obtains a second relay function parameter set of remote user equipment.

The second relay function parameter set is a parameter related to the relay function and supported by the remote user equipment.

Optionally, in an embodiment of the present invention, the second relay function parameter set includes at least one of the following relay function parameters:

the remote user equipment association identifier supported by the user equipment supporting the relay function, a device-to-device connection access mode currently selected by the remote user equipment, and a discovery mechanism of the discovery process that is selected by the remote user equipment.

Preferably, the remote user equipment association identifier supported by the user equipment supporting the relay function may be the ID of the remote user equipment.

Specifically, the device-to-device connection access mode includes but is not limited to communication over the wireless local area network (WLAN) and Bluetooth communication, and may further include LTE sidelink communication in the Long Term Evolution (LTE) system.

Specifically, when the access mode selected by the remote user equipment is LTE sidelink, the discovery mechanism includes the model A or the model B.

It should be noted that, in this embodiment of the present invention, different from the first relay function parameter set, the second relay function parameter set includes the relay function parameter currently selected by the remote user equipment. For example, the device-to-device connection access mode currently selected by the remote user equipment may be only one of a plurality of access modes supported by the remote user equipment, for example, the access mode A. Likewise, if the discovery mechanism currently selected by the remote user equipment is the model A, the discovery mechanism of the discovery process that is selected by the remote user equipment is the model A.

Optionally, in some embodiments of the present invention, the method further includes:

the network device obtains a third relay function parameter set of the remote user equipment; and the network device incorporates the third relay function parameter set into the second relay function parameter set to update the second relay function parameter set and obtain a new second relay function parameter set, where the first relay function parameter set of the at least one user equipment supporting the relay function includes the new second relay function parameter set.

The third relay function parameter set includes at least one of the following function parameters:

a public land mobile network, PLMN, identity currently selected by the remote user equipment and a current serving frequency of the remote user equipment.

For example, in an example of the present invention, if a first relay function parameter initially obtained by the network device is the ID 1, the access mode A. and the model A, and then the network device obtains a third relay function parameter set that is a PLMN 1 and a serving frequency 1, and then obtains a new first relay function parameter set that is the ID 1, the access mode A, the model A, the PLMN 1, and the serving frequency 1, the new first relay function parameter set is used when the first relay function parameter set is used subsequently.

S303. The network device determines, for the remote user equipment, at least one of the N user equipment supporting the relay function, where a first relay function parameter set of the at least one user equipment supporting the relay function and the second relay function parameter set satisfy a preset matching relationship.

The at least one user equipment supporting the relay function and determined by the network device for the remote user equipment is user equipment that can satisfy a discovery function requirement of the remote user equipment.

The preset matching relationship is preset and used to determine the at least one user equipment supporting the relay function. The preset matching relationship is used to denote a matching relationship between the first relay function parameter set and the second relay function parameter set.

It should be noted that, that the first relay function parameter set supported by the user equipment supporting the relay function and the second relay function parameter set selected by the remote user equipment satisfy the preset matching relationship is used to indicate that the second relay function parameter selected by the remote user equipment is supported by the user equipment supporting the relay function, that is, exists in the first relay function parameter set.

For example, in an example of the present invention, if the first relay function parameter set includes access modes {WLAN, Bluetooth communication}, but an access mode in the second relay function parameter set is WLAN, it may be understood that, the access mode parameter satisfies the preset matching relationship; however, if the access mode in the second relay function parameter set is LTE, it may be understood that, the access mode parameter does not satisfy the preset matching relationship. Likewise, matching of other relay function parameters is similar.

Further, optionally, if the second relay function parameter set selected by the remote user equipment does not completely belong to the first relay function parameter set supported by the user equipment supporting the relay function, one or more user equipment supporting the relay function may be selected if the first relay function parameter set and the second relay function parameter set satisfy a maximum matching condition.

S304. The network device sends a first notification message to the at least one user equipment supporting the relay function, where the first notification message is used to trigger the at least one user equipment supporting the relay function to initiate a device-to-device discovery process.

Optionally, in some embodiments of the present invention, the first notification message includes at least one of the following parameters:

instruction information used to initiate the discovery process, the device-to-device connection access mode, a carrier frequency for sending and/or receiving a discovery message in the discovery process, the discovery mechanism of the discovery process, and a sending and/or receiving resource pool used for sending and/or receiving the discovery message in the discovery process.

Specifically, the device-to-device connection access mode includes but is not limited to communication over the wireless local area network (WLAN) and Bluetooth communication, and may further include LTE sidelink communication in the Long Term Evolution (LTE) system.

Specifically, when the access mode is LTE sidelink, the discovery mechanism includes the model A or the model B.

Specifically, after receiving the first notification message, the user equipment supporting the relay function starts the discovery process based on information provided in the first notification message.

It may be understood that, the first notification message carries a discovery instruction and some parameters used in the discovery process, so that the user equipment supporting the relay function can perform the discovery process based on the parameters.

Specifically, in an embodiment of the present invention, if the network device is the MME, that the network device sends a first notification message to the at least one user equipment supporting the relay function includes:

the MME sends a third notification message to the base station, where the third notification message is used to instruct the base station to send the first notification message to the at least one user equipment supporting the relay function.

Optionally, in some embodiments of the present invention, the third notification message includes at least one of the following parameters:

a user equipment identity of the at least one user equipment supporting the relay function, the instruction information used to initiate the discovery process, the device-to-device connection access mode, the carrier frequency for sending and/or receiving the discovery message in the discovery process, the discovery mechanism of the discovery process, and the sending and/or receiving resource pool used for sending and/or receiving the discovery message in the discovery process.

Specifically, the user equipment identity may be an international mobile subscriber identity (IMSI) or a short temporary identity (S-TMSI) of the user equipment supporting the relay function.

Optionally, the sending and/or receiving resource pool used for sending and/or receiving the discovery message in the discovery process may also be determined by the base station based on the user equipment identity.

Further, specifically, after receiving the third notification message, the base station determines, based on IMSI or S-TMSI information included in the third notification message, which user equipment supporting the relay function need to be triggered to start the discovery process.

It may be understood that, after the MME determines the at least one user equipment supporting the relay function, the MME needs to send the first notification message by using the base station, to notify the at least one user equipment supporting the relay function. Therefore, the MME may send the third notification message to the base station to instruct the base station to send the first notification message.

Optionally, in some embodiments of the present invention, if the user equipment supporting the relay function is in the connected state, the first notification message is a dedicated control message.

Specifically, the first notification message may be an RRC connection reconfiguration message.

Optionally, in other embodiments of the present invention, if the user equipment supporting the relay function is in the idle state or the connected state, the first notification message is a paging message.

Optionally, in some embodiments of the present invention, if the first notification message is a paging message, the first notification message further includes the user equipment identity of the at least one user equipment supporting the relay function.

Optionally, in some embodiments of the present invention, if the first notification message includes a paging message, that the user equipment initiates the discovery process based on the first notification message includes:

the user equipment receives the paging message at a preset monitoring time; and if the first notification message includes a user equipment identity of the user equipment, the user equipment initiates the discovery process based on the first notification message.

The user equipment supports the relay function, and the preset monitoring time is a monitoring time predetermined by the user equipment.

For example, in an example of the present invention, when the first notification message is a paging message, and when the paging message received by the user equipment supporting the relay function includes information added by the base station to the paging message and the information includes the user equipment identity of the user equipment, for example, a user ID, the user equipment initiates a relay discovery process.

It may be understood that, when the user equipment supporting the relay function is in different states, using different notification messages can better satisfy communication requirements. In addition, the user equipment that supports the relay function and is in the connected state can be notified by using a dedicated control message, and therefore notification efficiency is higher.

Further, the discovery process may enable the remote user equipment to discover and select user equipment that provides relay support, so that the remote user equipment can access a network by using the user equipment.

In the technical solution provided by this embodiment of the present invention, the network device obtains the N first relay function parameter sets of the N user equipment supporting the relay function, where the N first relay function parameter sets correspond to the N user equipment supporting the relay function, and N is a positive integer; then the network device obtains the second relay function parameter set of the remote user equipment, and determines, for the remote user equipment, at least one of the N user equipment supporting the relay function, where the first relay function parameter set of the at least one user equipment supporting the relay function and the second relay function parameter set satisfy the preset matching relationship; and finally the network device sends the first notification message to the at least one user equipment supporting the relay function, where the first notification message is used to trigger the at least one user equipment supporting the relay function to initiate the device-to-device discovery process. The network device determines at least one of the N user equipment supporting the relay function, and the network device triggers only the determined at least one user equipment supporting the relay function to initiate the device-to-device discovery process. Therefore, unnecessary power consumption for initiating the discovery process by user equipment that supports the relay function but does not satisfy the discovery function requirement of the remote user equipment is reduced.

Further, some of the N user equipment supporting the relay function are first determined. Therefore, when a discovery requirement of the remote user equipment is notified during execution of the discovery process, resource consumption in a notification process can be reduced, and a process of mutual discovery by the remote user equipment and the user equipment supporting the relay function can be accelerated. For example, when a carrier frequency intended for discovery is notified to the user equipment supporting the relay function, the user equipment supporting the relay function may send or receive a discovery message only on the carrier frequency without trying a plurality of carrier frequencies.

Optionally, in some embodiments of the present invention, if the network device includes the base station, that a network device obtains N first relay function parameter sets of N user equipment supporting a relay function includes:

the base station receives a second notification message sent by the MME, where the second notification message includes the N first relay function parameter sets and user equipment identities of the N user equipment supporting the relay function.

Specifically, the user equipment identity may be a user ID, or may be another user information identity used to indicate user equipment supporting the relay function.

Optionally, the user equipment supporting the relay function includes user equipment in the ECM_IDLE state, and also includes user equipment in the ECM_CONNECTED state.

Preferably, the user equipment supporting the relay function is in the ECM_CONNECTED state. Specifically, when a status of the user equipment supporting the relay function changes from the ECM_IDLE state to the ECM_CONNECTED state, the MME notifies, by using a second message on an S1 interface, the base station of context information that is of the user equipment and is related to the relay function, that is, the first relay function parameter set.

Further, specifically, the first notification message may be an initial UE context request message, or may be another newly defined message.

Optionally, in other embodiments of the present invention, if the network device includes the base station, that a network device obtains N first relay function parameter sets of N user equipment supporting a relay function includes:

the base station sends a first request message to the MME, where the first request message includes the second relay function parameter set; and the base station receives a first request feedback message sent by the MME in response to the first request message, where the first request feedback message includes the N first relay function parameter sets and user identities of the N user equipment supporting the relay function.

The first request message is used to request the MME to provide ID information of user equipment that can provide relay support for the remote user equipment.

Optionally, the user equipment supporting the relay function includes user equipment in the ECM_IDLE state, and also includes user equipment in the ECM_CONNECTED state.

Preferably, the user equipment supporting the relay function is in the ECM_IDLE state, and the first request message is used to request the MME to provide information about the user equipment that is in the ECM_IDLE state but can provide relay support for the remote user equipment. Specifically, the MME receives the first request message sent by the base station, on the S1 interface. Then the MME finds, based on the foregoing information, all user equipment that satisfy a condition but are still in the ECM_IDLE state. Then the MME returns the first request feedback message on the S1 interface to the base station.

Specifically, the first request message includes at least one of the following information: the remote user equipment association identifier supported by the user equipment supporting the relay function, a device-to-device connection access mode supported by the remote user equipment, and a discovery mechanism of the discovery process that is supported by the remote user equipment.

Specifically, the first request message may be a newly defined message, and the first request feedback message may be a newly defined message.

It may be understood that, the MME actively provides an identity of the user equipment supporting the relay function and a corresponding parameter for the remote user equipment, or the base station requests the MME to send an identity of the user equipment supporting the relay function and a corresponding parameter, so that the base station obtains the first relay function parameter set in a flexible manner.

Optionally, in some embodiments of the present invention, that the network device obtains a second relay function parameter set of remote user equipment includes:

the network device obtains the second relay function parameter set of the remote user equipment from the remote user equipment.

It may be understood that, the second relay function parameter set related to the remote user equipment may be directly obtained from the remote user equipment, so that obtaining efficiency is high.

Optionally, in some embodiments of the present invention, if the network device is the base station, that the network device obtains a second relay function parameter set of remote user equipment includes:

the base station receives a second request message sent by the remote user equipment, where the second request message includes the second relay function parameter set.

Specifically, after the remote user equipment triggers the discovery process, the remote user equipment sends the second request message to the base station.

Specifically, the second request message may be sidelink UE information in a current protocol, or may be a newly defined control message.

Optionally, in some embodiments of the present invention, if the network device is the MME, that the network device obtains a second relay function parameter set of remote user equipment includes:

the MME receives a third request message sent by the remote user equipment, where the third request message includes the second relay function parameter set.

Specifically, after the remote user equipment triggers the discovery process, the remote user equipment sends the third request message to the MME.

Specifically, the third request message is a newly defined NAS message.

It may be understood that, the second relay function parameter set related to the remote user equipment may be directly obtained from the remote user equipment, so that obtaining efficiency is high.

Optionally, in some embodiments of the present invention, after the base station determines that the remote user equipment has successfully established a connection to one user equipment supporting the relay function, the method further includes:

after the base station determines that one of the at least one user equipment supporting the relay function is connected to the remote user equipment, the base station sends a fourth notification message to another user equipment supporting the relay function in the at least one user equipment supporting the relay function different from the one user equipment supporting the relay function, where the fourth notification message is used to instruct the another user equipment supporting the relay function to stop the discovery process.

Optionally, the fourth notification message includes at least one of the following parameters:

the remote user equipment association identifier supported by the user equipment supporting the relay function and instruction information used to stop the discovery process.

Further, when the user equipment supporting the relay function receives the fourth notification message, if the fourth notification message includes a user equipment identity of the user equipment supporting the relay function, the user equipment stops the discovery process based on the fourth notification message.

Optionally, in some embodiments of the present invention, if the user equipment supporting the relay function is in the connected state, the fourth notification message is a dedicated control message.

Further, in this case, after the user equipment supporting the relay function receives the fourth notification message, the user equipment stops the discovery process.

Optionally, in other embodiments of the present invention, if the relay device is in the idle state or the connected state, the fourth notification message includes a paging message.

Further, in this case, when the user equipment supporting the relay function detects the fourth notification message and the fourth notification message includes the user equipment identity of the user equipment, the user equipment stops the discovery process.

It may be understood that, the fourth notification message is sent to the user equipment supporting the relay function to stop the discovery process. Therefore, after the remote user equipment has successfully established a connection to one user equipment supporting the relay function, other user equipment supporting the relay function are allowed to stop the discovery process in time to reduce unnecessary power consumption.

Optionally, in some embodiments of the present invention, the first notification message includes a time identifier, and the time identifier is used to instruct the at least one user equipment supporting the relay function to stop the discovery process after a preset time period corresponding to the time identifier elapses after the first notification message is received.

Specifically, the first notification message sent by the base station for triggering the user equipment supporting the relay function to start the discovery process includes a value of a timer.

Preferably, the time of the timer is a maximum duration of performing discovery by the user equipment supporting the relay function.

Further, specifically, after receiving the first notification message, the user equipment supporting the relay function starts the discovery process based on the information provided in the first notification message, and also starts a timer. After the timer expires, the user equipment supporting the relay function automatically stops the discovery process.

It may be understood that, the first notification message includes the time identifier used to control the user equipment supporting the relay function to stop the discovery process. Therefore, control of the discovery process is more flexible, and other user equipment supporting the relay function are allowed to stop the discovery process in time to reduce unnecessary power consumption.

Figure 4:
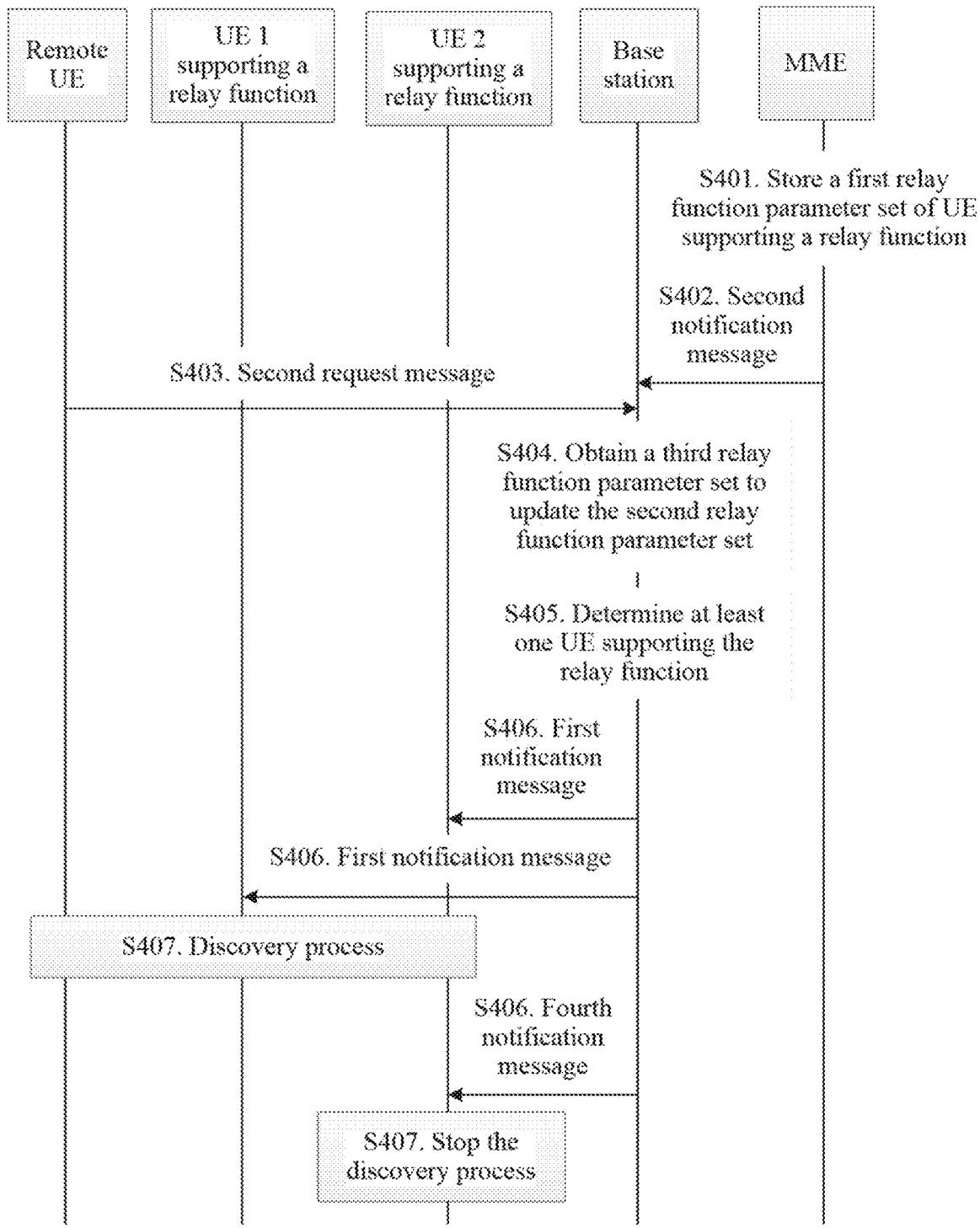
FIG. 4 is a schematic flowchart of another method for controlling device-to-device discovery according to an embodiment of the present invention.

FIG. 4 is a schematic flowchart of another method for controlling device-to-device discovery according to an embodiment of the present invention. This embodiment is a preferred specific embodiment based on the embodiment shown in FIG. 3. In this embodiment, UE supporting a relay function is used to denote user equipment supporting the relay function, and remote UE is used to denote remote user equipment. In the method shown in FIG. 4, for content same as or similar to that of the method shown in FIG. 3, refer to the detailed descriptions in FIG. 3. Details are not described again herein. As shown in FIG. 4, the method may include the following steps.

S401. An MME stores a first relay function parameter of UE supporting a relay function.

S402. The MME sends a second notification message to a base station, and the base station receives the second notification message sent by the MME.

The second notification message includes the N first relay function parameter sets and user equipment identities of N user equipment supporting the relay function, where the N user equipment supporting the relay function are in an ECM_CONNECTED state.

S403. Remote UE sends a second request message to the base station, and the base station receives the second request message sent by the remote UE.

The second request message includes a second relay function parameter set of the remote UE.

S404. The base station obtains a third relay function parameter set of the UE supporting the relay function to update the first relay function parameter set.

S405. The base station determines, for the remote user equipment, at least one of the N UEs supporting the relay function.

A first relay function parameter set of the at least one UE supporting the relay function and the second relay function parameter set satisfy a preset matching relationship.

Specifically, in this embodiment of the present invention, the at least one UE supporting the relay function includes UE 1 supporting the relay function and UE 2 supporting the relay function.

S406. The base station sends a first notification message to the at least one UE supporting the relay function. The at least one UE supporting the relay function receives the first notification message.

The first notification message is used to trigger the at least one user equipment supporting the relay function to initiate a device-to-device discovery process.

S407. The at least one UE supporting the relay function initiates a discovery process.

S408. After the base station determines that the remote UE discovers and selects one UE supporting the relay function, the base station sends a fourth notification message to another UE supporting the relay function.

Specifically, in this embodiment of the present invention, if the base station determines that the remote UE discovers and selects the UE 1 supporting the relay function, the base station sends the fourth notification message to the UE2 supporting the relay function.

Preferably, the notification message is a dedicated control message.

Specifically, the notification message is an RRC connection reconfiguration message.

S409. The another UE supporting the relay function stops the discovery process.

Specifically, after receiving the RRC connection reconfiguration message, the UE 2 supporting the relay function stops the discovery process.

In this embodiment, at least one UE that is in the ECM_CONNECTED state and supports the relay function is determined, and therefore unnecessary power consumption for initiating the discovery process by user equipment that supports the relay function but does not satisfy a discovery function requirement of the remote user equipment is reduced.

Figure 5:
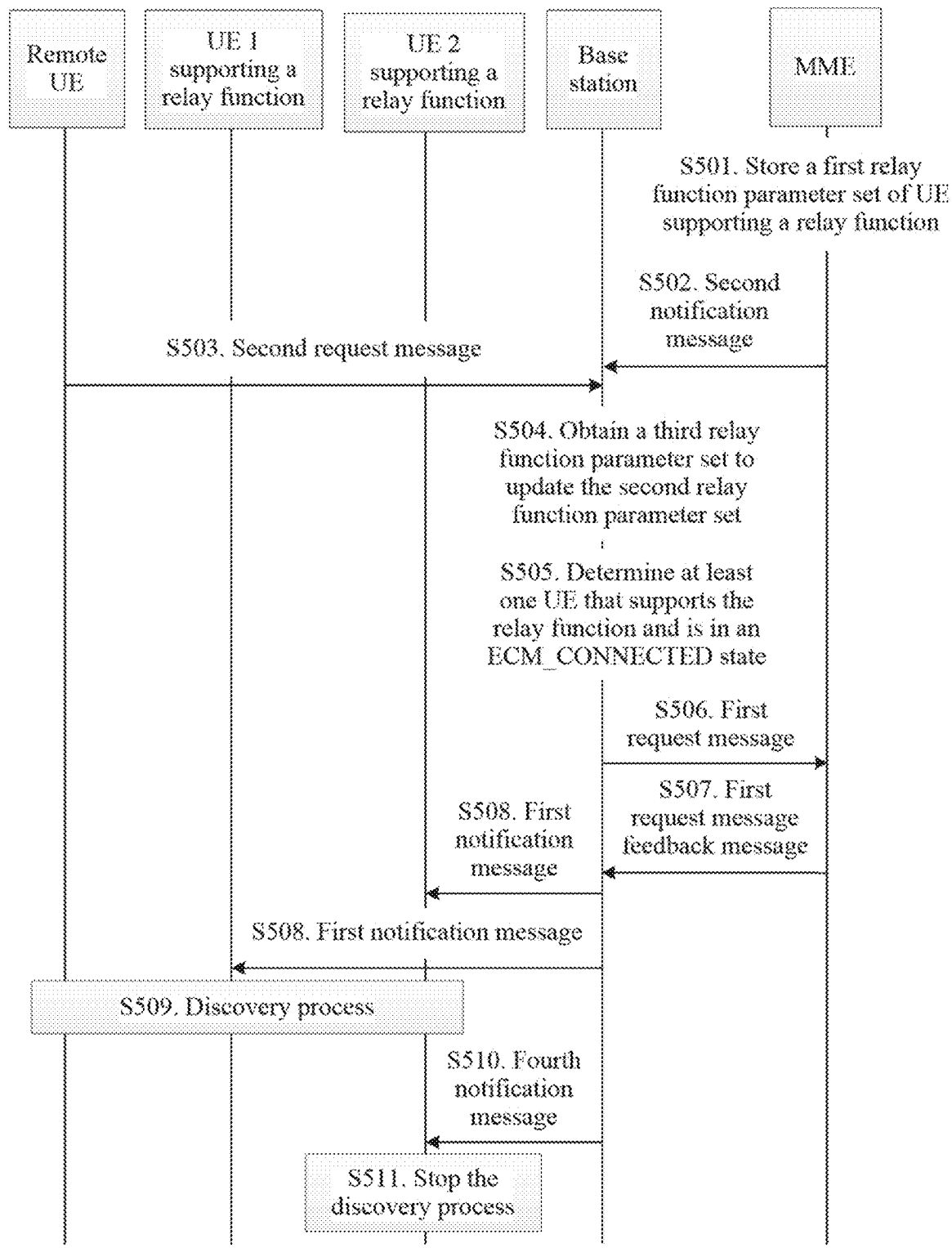
FIG. 5 is a schematic flowchart of still another method for controlling device-to-device discovery according to an embodiment of the present invention.

FIG. 5 is a schematic flowchart of still another method for controlling device-to-device discovery according to an embodiment of the present invention. This embodiment is a preferred specific embodiment based on the embodiment shown in FIG. 3. In this embodiment, UE supporting a relay function is used to denote user equipment supporting the relay function, and remote UE is used to denote remote user equipment. In the method shown in FIG. 5, for content same as or similar to that of the method shown in FIG. 3, refer to the detailed descriptions in FIG. 3. Details are not described again herein. As shown in FIG. 5, the method may include the following steps.

S501. An MME stores a first relay function parameter of UE supporting a relay function.

S502. The MME sends a second notification message to a base station, and the base station receives the second notification message sent by the MME.

The second notification message includes the N1 first relay function parameter sets and user equipment identities of N1 user equipment supporting the relay function, where the N1 user equipment supporting the relay function are in an ECM_CONNECTED state.

S503. Remote UE sends a second request message to the base station, and the base station receives the second request message sent by the remote UE.

The second request message includes a second relay function parameter set of the remote UE.

S504. The base station obtains a third relay function parameter set of the UE supporting the relay function to update the first relay function parameter set.

S505. The base station determines, for the remote UE, at least one of the N UEs that support the relay function and are in an ECM_CONNECTED state.

A first relay function parameter set of the at least one UE supporting the relay function and the second relay function parameter set satisfy a preset matching relationship.

S506. The base station sends a first request message to the MME, and the MME receives the first request message sent by the base station.

The first request message is used to request the MME for ID information of UE that is in an ECM_IDLE state but can provide relay support for the remote UE.

Specifically, the first request message includes the second relay function parameter set.

Specifically, the MME finds, based on the first request message, all UEs that support the relay function and satisfy a condition but are still in the ECM_IDLE state.

S507. The MME returns first request feedback information to the base station, and the base station receives the first request feedback information sent by the MME.

The first request feedback information includes the N2 first relay function parameter sets and user identities of the N2 UEs that support the relay function and are in the ECM_IDLE state.

Specifically, the first request feedback information is a response message on an S1 interface, and the first request feedback information is newly defined information.

S508. The base station sends a first notification message to the UE supporting the relay function.

The UE supporting the relay function includes the at least one of the N1 UEs that support the relay function and are in the ECM_CONNECTED state, determined in step S505, and the N2 UEs that support the relay function and are in the ECM_IDLE state and are determined in step S507.

Specifically, in this embodiment of the present invention, the UE supporting the relay function includes UE 1 supporting the relay function and UE 2 supporting the relay function.

The first notification message is used to trigger the user equipment supporting the relay function to initiate a device-to-device discovery process.

Specifically, the first notification message is a paging message.

S509. The at least one UE supporting the relay function initiates a discovery process.

Optionally, when the UE supporting the relay function is in the ECM_CONNECTED state, and when the paging message received by the UE supporting the relay function includes information added by the base station to the paging message in S508 and the information includes an ID of the UE supporting the relay function, the UE supporting the relay function initiates a relay discovery process.

Optionally, when the UE supporting the relay function is in the ECM_IDLE state, and when the paging message includes information added by the base station to the paging message in S508, the UE does not need to initiate an RRC connection establishment process, but only needs to initiate a relay discovery process.

S510. After the base station determines that the remote UE discovers and selects at least one UE supporting the relay function, the base station sends a fourth notification message to another UE supporting the relay function. The another UE supporting the relay function receives the fourth notification message.

Specifically, in this embodiment of the present invention, if the base station determines that the remote UE discovers and selects the UE 1 supporting the relay function, the base station sends the fourth notification message to the UE2 supporting the relay function.

Preferably, the notification message is a paging message.

S511. The another UE supporting the relay function stops the discovery process.

Specifically, after receiving the paging message, the UE 2 supporting the relay function stops the discovery process.

In this embodiment, on a basis of the embodiment corresponding to FIG. 4, the UE that supports the relay function and is in the ECM_IDLE state is further determined. Therefore, when the UE that supports the relay function is in the ECM_IDLE state, the UE that supports the relay function and is in the ECM_IDLE state can also be determined. It is ensured that a most suitable UE supporting the relay function can be provided for a terminal.

Figure 6:
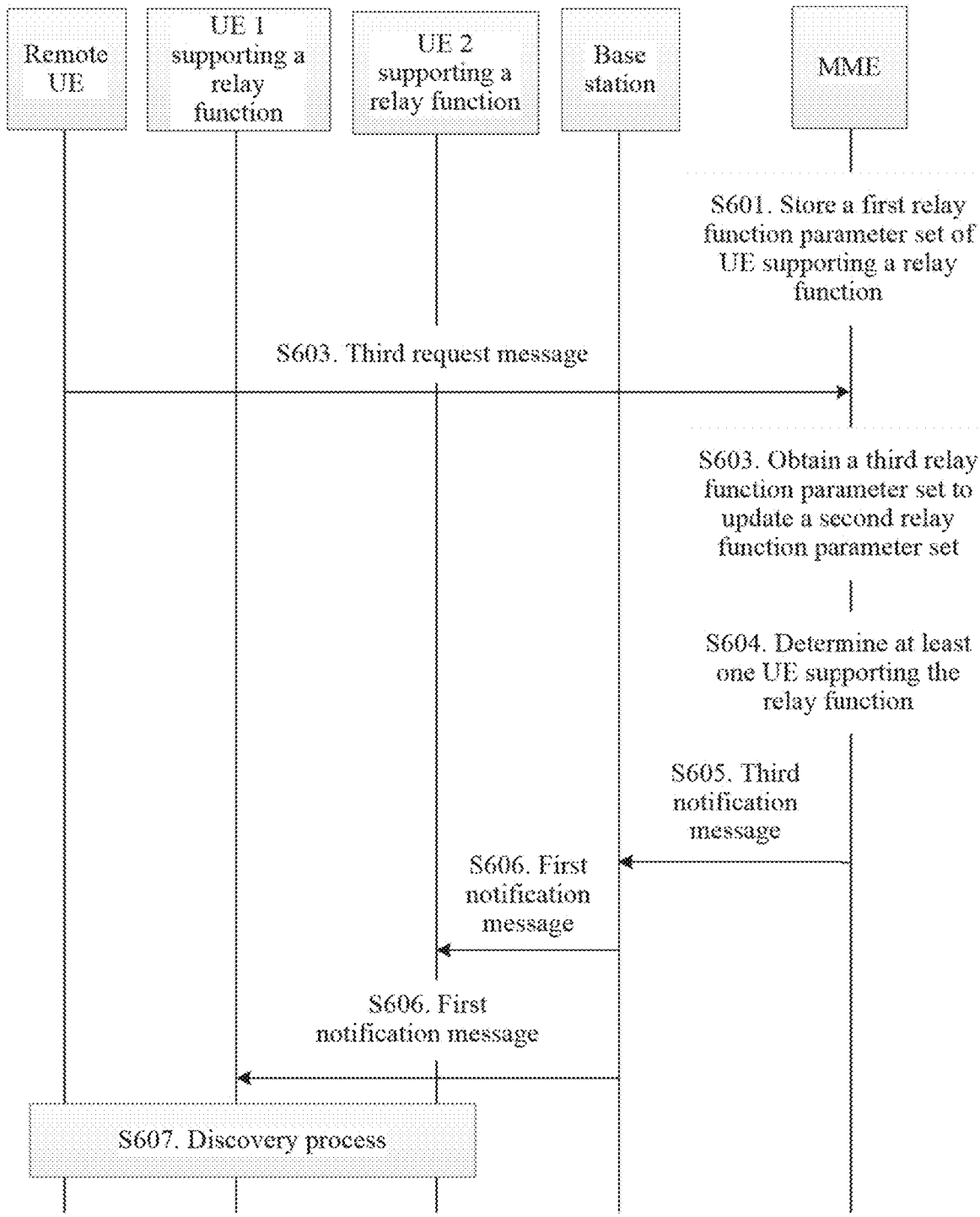
FIG. 6 is a schematic flowchart of still another method for controlling device-to-device discovery according to an embodiment of the present invention.

FIG. 6 is a schematic flowchart of still another method for controlling device-to-device discovery according to an embodiment of the present invention. This embodiment is a preferred specific embodiment based on the embodiment shown in FIG. 3. In this embodiment, UE supporting a relay function is used to denote user equipment supporting the relay function, and remote UE is used to denote remote user equipment. In the method shown in FIG. 6, for content same as or similar to that of the method shown in FIG. 3, refer to the detailed descriptions in FIG. 3. Details are not described again herein. As shown in FIG. 6, the method may include the following steps.

S601. An MME stores a first relay function parameter of UE supporting a relay function.

S602. Remote UE sends a third request message to the MME, and the MME receives the third request message sent by the remote UE.

The third request message includes a second relay function parameter set of the remote UE.

S603. The MME obtains a third relay function parameter set of the UE supporting the relay function to update the first relay function parameter set.

S604. The MME determines, for the remote UE, at least one of N UEs supporting the relay function.

S605. The MME sends a third notification message to a base station. The base station receives the third notification message sent by the MME.

The third notification message is used to instruct the base station to send the first notification message to the at least one user equipment supporting the relay function.

S606. The base station sends a first notification message to the at least one UE supporting the relay function and determined in S606. The at least one UE supporting the relay function receives the notification message.

Specifically, the first notification message is a paging message.

S607. The at least one UE supporting the relay function initiates a discovery process.

In this embodiment, the MME determines the UE supporting the relay function and providing relay function support for the remote UE, and therefore power consumption of the base station can be reduced.

Figure 7:
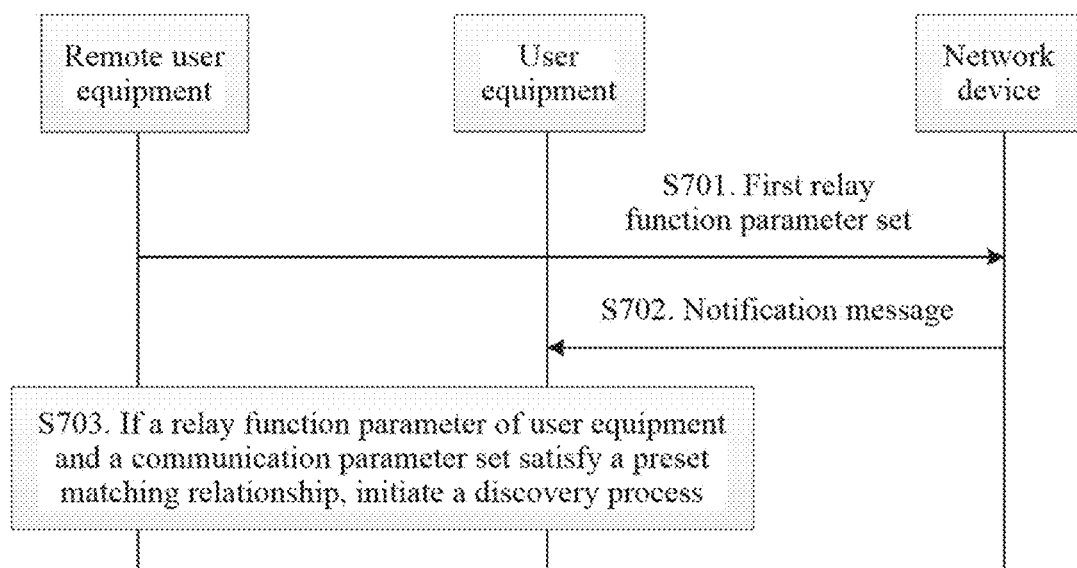
FIG. 7 is a schematic flowchart of an embodiment of a method for controlling device-to-device discovery according to an embodiment of the present invention.

FIG. 7 is a schematic flowchart of an embodiment of a method for controlling device-to-device discovery according to an embodiment of the present invention. In the method shown in FIG. 7, for content same as or similar to that of the method shown in FIG. 3, refer to the detailed descriptions in FIG. 3. Details are not described again herein. As shown in FIG. 7, the method may include the following steps.

S701. A network device obtains a second relay function parameter set of remote user equipment.

Specifically, after the remote user equipment triggers a relay UE discovery process, the network device obtains the second relay function parameter set of the remote user equipment.

Preferably, the network device is a base station.

The second relay function parameter set includes at least one of the following relay function parameters:

a remote user equipment association identifier supported by the user equipment supporting a relay function, a device-to-device connection access mode currently selected by the remote user equipment, and a discovery mechanism of the discovery process that is selected by the remote user equipment.

Optionally, the method further includes:

the network device obtains a third relay function parameter set of the remote user equipment; and the network device incorporates the third relay function parameter set into the second relay function parameter set to update the second relay function parameter set and obtain a new second relay function parameter set, where a first relay function parameter set of the at least one user equipment supporting the relay function includes the new second relay function parameter set.

The third relay function parameter set includes at least one of the following function parameters:

a public land mobile network (PLMN) identity currently selected by the remote user equipment and a current serving frequency of the remote user equipment.

S702. The network device sends a notification message to user equipment. The user equipment receives the notification message sent by the network device.

If the user equipment supports the relay function, the notification message is used to trigger the user equipment to initiate a device-to-device discovery process, the notification message includes a communication parameter set for initiating the device-to-device discovery process by the user equipment, and the communication parameter set is determined based on the second relay function parameter set.

Specifically, the notification message is a paging message.

Optionally, the communication parameter set includes at least one of the following parameters:

instruction information used to initiate the discovery process, the device-to-device connection access mode, a public land mobile network (PLMN) identity in the discovery process, a carrier frequency for sending and/or receiving a discovery message in the discovery process, a discovery mechanism of the discovery process, and a sending and/or receiving resource pool used for sending and/or receiving the discovery message in the discovery process.

Optionally, the notification message includes a paging message.

S703. If a relay function parameter set of the user equipment and the communication parameter set satisfy a preset matching relationship, the user equipment initiates a device-to-device discovery process.

Optionally, the relay function parameter set includes at least one of the following parameters:

the remote user equipment association identifier supported by the user equipment supporting the relay function, a device-to-device connection access mode supported by the user equipment supporting the relay function, a public land mobile network (PLMN) identity supported by the user equipment supporting the relay function, a carrier frequency supported by the user equipment supporting the relay function, and a discovery mechanism of the device-to-device discovery process that is supported by the user equipment supporting the relay function.

Specifically, the user equipment performs monitoring on each PO of the user equipment, and when detecting that the communication parameter set in the paging message matches the relay parameter set of the user equipment, the user equipment initiates the discovery process.

Further, the user equipment may perform the discovery process based on the communication parameter set. For example, the user equipment may determine, based on resource configuration information that is included in the information and used by the remote user equipment to send the discovery message, resource locations in which the discovery message should be received.

In an example of the present invention, if the user equipment is in an RRC_IDLE state, and when the paging message includes information added by the base station to the paging message but does not include a user equipment identity of the user equipment, the user equipment does not need to initiate an RRC connection establishment process.

In the technical solution provided by this embodiment of the present invention, the network device obtains the second relay function parameter set of the remote user equipment; then the network device sends the notification message to the user equipment, where the user equipment supports the relay function, the notification message includes the communication parameter set for initiating the device-to-device discovery process by the user equipment, and the communication parameter set is determined based on the second relay function parameter set; then the user equipment receives the first notification message sent by the network device, where the first notification message is used to trigger at least one user equipment supporting the relay function to initiate the device-to-device discovery process, the at least one user equipment supporting the relay function is determined by the network device from N user equipment supporting the relay function, and the user equipment supports the relay function; and finally, the user equipment initiates the discovery process based on the first notification message. When the relay function parameter set of the user equipment supporting the relay function and the communication parameter set for initiating the device-to-device discovery process by the user equipment satisfy the preset matching relationship, the user equipment initiates the discovery process. Therefore, unnecessary power consumption for initiating the discovery process by user equipment that supports the relay function but does not satisfy a discovery function requirement of the remote user equipment is reduced.

Further, only some user equipment supporting the relay function perform the discovery process. Therefore, when a discovery requirement of the remote user equipment is notified, resource consumption in a notification process can be reduced, and a process of mutual discovery by the remote user equipment and the user equipment supporting the relay function can be accelerated. For example, when a carrier frequency intended for discovery is notified to the user equipment supporting the relay function, the user equipment supporting the relay function may send or receive a discovery message only on the carrier frequency without trying a plurality of carrier frequencies.

Figure 8:
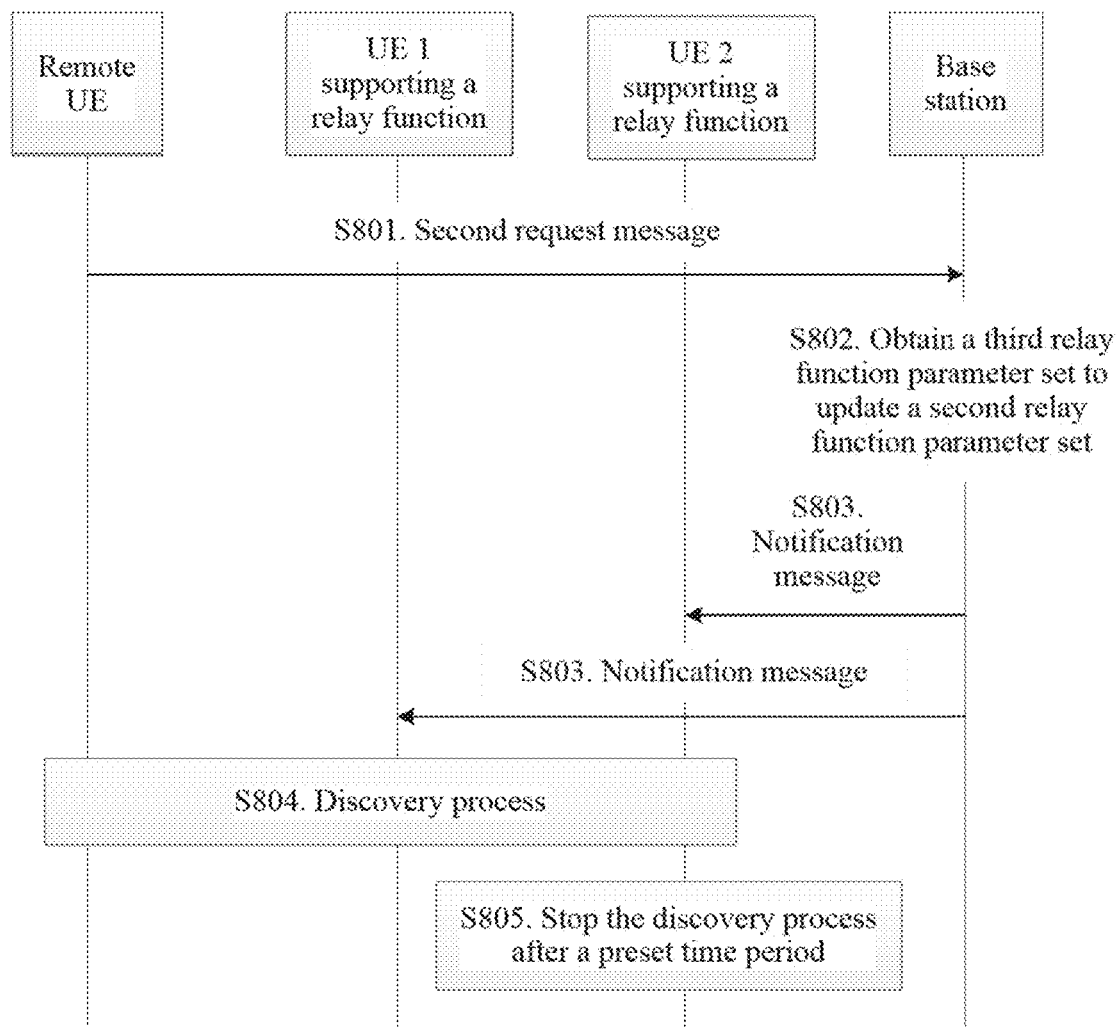
FIG. 8 is a schematic flowchart of another method for controlling device-to-device discovery according to an embodiment of the present invention.

FIG. 8 is a schematic flowchart of another method for controlling device-to-device discovery according to an embodiment of the present invention. This embodiment is a preferred specific embodiment based on the embodiment shown in FIG. 7. In this embodiment, a network device is a base station, UE supporting a relay function is used to denote user equipment supporting the relay function, and remote UE is used to denote remote user equipment. In the method shown in FIG. 8, for content same as or similar to that of the method shown in FIG. 3 or FIG. 7, refer to the detailed descriptions in FIG. 3 or FIG. 7. Details are not described again herein. As shown in FIG. 8, the method may include the following steps.

S801. Remote UE sends a second request message to a base station, and the base station receives the third request message sent by the remote UE.

The second request message includes a second relay function parameter set of the remote UE.

S802. The base station obtains a third relay function parameter set of UE supporting a relay function to update a first relay function parameter set.

In this embodiment of the present invention, the UE supporting the relay function includes UE 1 supporting the relay function and UE 2 supporting the relay function.

S803. The base station sends a notification message to the UE supporting the relay function. The UE supporting the relay function receives the notification message.

The notification message is used to trigger the user equipment to initiate a device-to-device discovery process, the notification message includes a communication parameter set for initiating the device-to-device discovery process by the user equipment, and the communication parameter set is determined based on the second relay function parameter set.

Specifically, the notification message is a paging message.

Specifically, the notification message includes a time identifier, and the time identifier is used to instruct the at least one user equipment supporting the relay function to stop the discovery process after a preset time period corresponding to the time identifier elapses after the first notification message is received.

Specifically, the preset time period indicated by the time identifier is a maximum duration of performing discovery by the UE supporting the relay function. Therefore, after the UE supporting the relay function receives the first notification message, and a connection is successfully established between the remote UE and the UE supporting the relay function, another UE supporting the relay function can automatically stop the discovery process.

S804. The UE supporting the relay function initiates a device-to-device discovery process.

In this embodiment of the present invention, a relay function parameter set of the UE 1 supporting the relay function and the communication parameter set satisfy a preset matching relationship. A relay function parameter set of the UE 1 supporting the relay function and the communication parameter set do not satisfy the preset matching relationship.

S805. UE 2 supporting the relay function stops the device-to-device discovery process after a preset time period.

In this embodiment of the present invention, when the relay function parameter set of the user equipment supporting the relay function and the communication parameter set for initiating the device-to-device discovery process by the user equipment satisfy the preset matching relationship, the user equipment initiates the discovery process. Therefore, unnecessary power consumption for initiating the discovery process by user equipment that supports the relay function but does not satisfy a discovery function requirement of the remote user equipment is reduced.

Further, the first notification message includes the time identifier used to control the user equipment supporting the relay function to stop the discovery process. Therefore, control of the discovery process is more flexible, and other user equipment supporting the relay function are allowed to stop the discovery process in time to reduce unnecessary power consumption.

Figure 9:
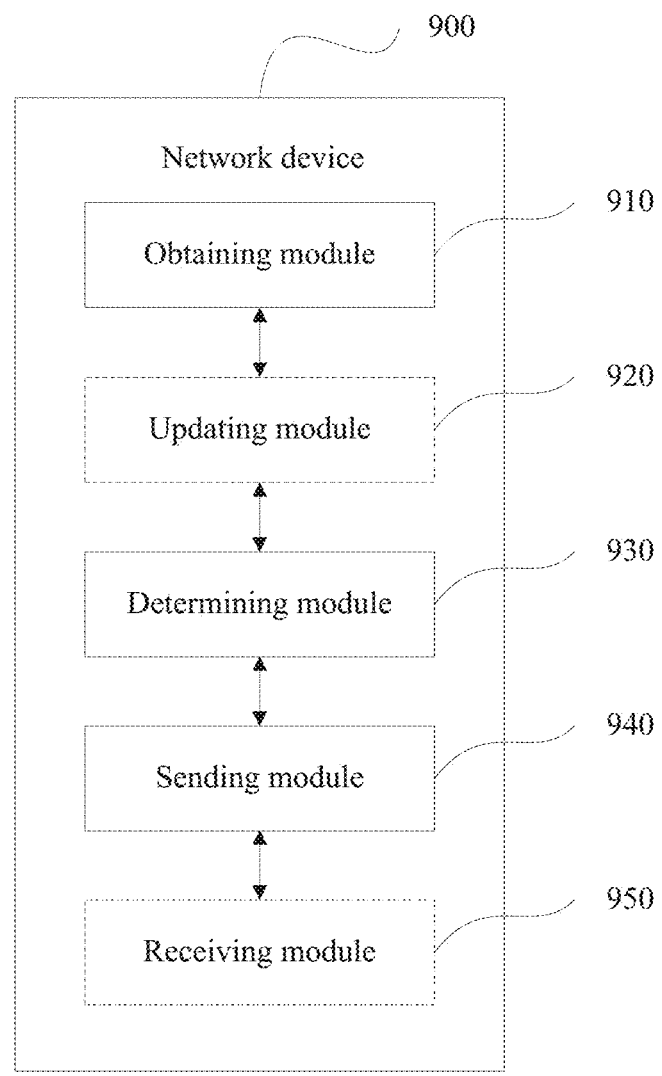
FIG. 9 is a schematic structural diagram of a network device according to an embodiment of the present invention.

FIG. 9 is a schematic structural diagram of a network device according to an embodiment of the present invention. As shown in FIG. 9, the network device 900 includes:

an obtaining module 910, configured to obtain N first relay function parameter sets of N user equipment supporting a relay function, where the N first relay function parameter sets correspond to the N user equipment supporting the relay function, and N is a positive integer; where the obtaining module 910 is further configured to obtain a second relay function parameter set of remote user equipment;

a determining module 920, configured to determine, for the remote user equipment, at least one of the N user equipment supporting the relay function, where a first relay function parameter set of the at least one user equipment supporting the relay function and the second relay function parameter set satisfy a preset matching relationship; and a sending module 930, configured to send, by the network device, a first notification message to the at least one user equipment supporting the relay function, where the first notification message is used to trigger the at least one user equipment supporting the relay function to initiate a device-to-device discovery process.

Optionally, the network device includes a base station or a mobility management entity (MME).

Optionally, if the network device includes the base station, when obtaining the N first relay function parameter sets of the N user equipment supporting the relay function, the obtaining module 910 is specifically configured to:

receive a second notification message sent by the MME, where the second notification message includes the N first relay function parameter sets and user equipment identities of the N user equipment supporting the relay function.

Optionally, if the network device includes the base station, the sending module 930 is further configured to send a first request message to the MME, where the first request message includes the second relay function parameter set; and the network device 900 further includes:

a receiving module 940, configured to receive a first request feedback message sent by the MME in response to the first request message, where the first request feedback message includes the N first relay function parameter sets and user identities of the N user equipment supporting the relay function.

Optionally, the obtaining, by the obtaining module 910, a second relay function parameter set of remote user equipment includes:

obtaining, by the network device, the second relay function parameter set of the remote user equipment from the remote user equipment.

Optionally, if the network device is the base station, the obtaining, by the obtaining module 910, a second relay function parameter set of remote user equipment includes:

receiving, by using the receiving module 940, a second request message sent by the remote user equipment, where the second request message includes the second relay function parameter set.

Optionally, if the network device is the MME, the obtaining, by the obtaining module 910, a second relay function parameter set of remote user equipment includes:

receiving, by using the receiving module 940, a third request message sent by the remote user equipment, where the third request message includes the second relay function parameter set.

Optionally, the first relay function parameter set includes at least one of the following relay function parameters:

a remote user equipment association identifier supported by the user equipment supporting the relay function, a device-to-device connection access mode supported by the user equipment supporting the relay function, and a discovery mechanism of the discovery process that is supported by the user equipment supporting the relay function.

Optionally, the second relay function parameter set includes at least one of the following relay function parameters:

the remote user equipment association identifier supported by the user equipment supporting the relay function, a device-to-device connection access mode currently selected by the remote user equipment, and a discovery mechanism of the discovery process that is selected by the remote user equipment.

Optionally, the obtaining module 910 is further configured to obtain a third relay function parameter set of the remote user equipment; and the network device 900 further includes an updating dodule 950, configured to incorporate the third relay function parameter set into the second relay function parameter set to update the second relay function parameter set and obtain a new second relay function parameter set, where the first relay function parameter set of the at least one user equipment supporting the relay function includes the new second relay function parameter set.

Optionally, the third relay function parameter set includes at least one of the following function parameters:

a public land mobile network (PLMN) identity currently selected by the remote user equipment and a current serving frequency of the remote user equipment.

Optionally, the first notification message includes at least one of the following parameters:

instruction information used to initiate the discovery process, the device-to-device connection access mode, a carrier frequency for sending and/or receiving a discovery message in the discovery process, the discovery mechanism of the discovery process, and a sending and/or receiving resource pool used for sending and/or receiving the discovery message in the discovery process.

Optionally, if the network device is the MME, the sending, by a sending module 930, a first notification message to the at least one user equipment supporting the relay function includes:

sending a third notification message to the base station, where the third notification message is used to instruct the base station to send the first notification message to the at least one user equipment supporting the relay function.

Optionally, the third notification message includes at least one of the following parameters:

a user equipment identity of the at least one user equipment supporting the relay function, the instruction information used to initiate the discovery process, the device-to-device connection access mode, the carrier frequency for sending and/or receiving the discovery message in the discovery process, the discovery mechanism of the discovery process, and the sending and/or receiving resource pool used for sending and/or receiving the discovery message in the discovery process.

Optionally, the sending module 930 is further configured to:

after the base station determines that one of the at least one user equipment supporting the relay function is connected to the remote user equipment, send a fourth notification message to another user equipment supporting the relay function in the at least one user equipment supporting the relay function different from the one user equipment supporting the relay function, where the fourth notification message is used to instruct the another user equipment supporting the relay function to stop the discovery process.

Optionally, the fourth notification message includes at least one of the following parameters:

the remote user equipment association identifier supported by the user equipment supporting the relay function and instruction information used to stop the discovery process.

Optionally, if the user equipment supporting the relay function is in a connected state, the first notification message is a dedicated control message and/or the fourth notification message includes a dedicated control message.

Optionally, if the user equipment supporting the relay function is in an idle state or a connected state, the first notification message is a paging message and/or the fourth notification message includes a paging message.

Optionally, if the first notification message is a paging message, the first notification message further includes the user equipment identity of the at least one user equipment supporting the relay function.

Optionally, the first notification message includes a time identifier, and the time identifier is used to instruct the at least one user equipment supporting the relay function to stop the discovery process after a preset time period corresponding to the time identifier elapses after the first notification message is received.

In this embodiment of the present invention, the network device 900 determines at least one of the N user equipment supporting the relay function, and the network device 900 triggers only the determined at least one user equipment supporting the relay function to initiate the device-to-device discovery process. Therefore, unnecessary power consumption for initiating the discovery process by user equipment that supports the relay function but does not satisfy a discovery function requirement of the remote user equipment is reduced.

Further, some of the N user equipment supporting the relay function are first determined. Therefore, when a discovery requirement of the remote user equipment is notified during execution of the discovery process, resource consumption in a notification process can be reduced, and a process of mutual discovery by the remote user equipment and the user equipment supporting the relay function can be accelerated. For example, when a carrier frequency intended for discovery is notified to the user equipment supporting the relay function, the user equipment supporting the relay function may send or receive a discovery message only on the carrier frequency without trying a plurality of carrier frequencies.

In this embodiment, the network device 900 is presented in a form of a unit. Herein the "unit" may be an application-specific integrated circuit (ASIC), a processor and a memory for executing one or more software or firmware programs, an integrated logic circuit, and/or other components that can provide the foregoing functions. □

It may be understood that, functions of each functional unit of the network device 900 in this embodiment may be specifically implemented according to the method in the foregoing method embodiment. For a specific implementation process thereof, refer to the related description in the foregoing method embodiment. Details are not described again herein.

Figure 10:
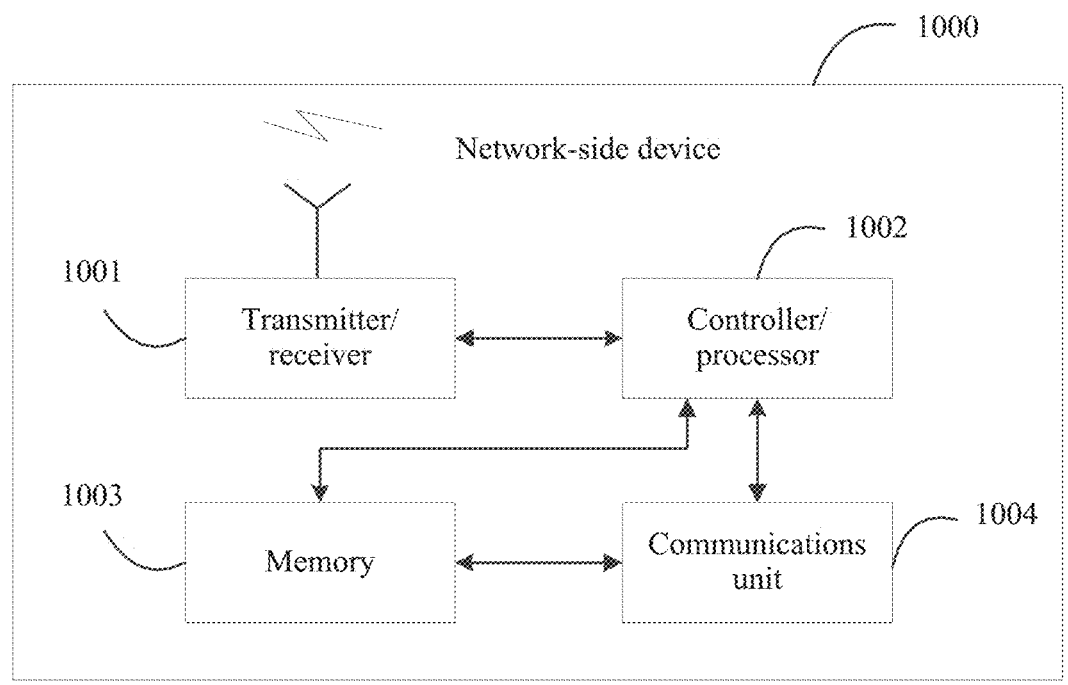
FIG. 10 is a schematic structural diagram of another network device according to an embodiment of the present invention.

FIG. 10 is a schematic structural diagram of another network device according to an embodiment of the present invention. As shown in FIG. 10, the network device 1000 includes:

a transmitter/receiver 1001 and a processor 1002. The processor 1002 may also be a controller, and is denoted as "controller/processor 1002" in FIG. 10. The transmitter/receiver 1001 is configured to support the network-side device in sending information to or receiving information from the terminal in the foregoing embodiment, and support the terminal in performing radio communication with another terminal. The processor 1002 performs various functions used to communicate with the terminal. On an uplink, an uplink signal from the terminal is received by an antenna, demodulated (for example, a high frequency signal is demodulated into a baseband signal) by the receiver 1001, and further processed by the processor 1002, so that service data and signaling information sent by the terminal are restored. On a downlink, service data and a signaling message are processed by the processor 1002, and modulated (for example, a baseband signal is modulated into a high frequency signal) by the transmitter 1001, so that a downlink signal is generated and transmitted to the user equipment by using the antenna. It should be noted that, the demodulation or modulation function may also be implemented by the processor 1002. For example, the processor 1002 is further configured to perform corresponding steps in the foregoing method embodiment, and/or another process in the technical solution described in this embodiment of the present invention.

Further, the network device 1000 may further include a memory 1003, where the memory 1003 is configured to store program code and data of the network device 1000. In addition, the network device 1000 may further include a communications unit 1004. The communications unit 1004 is configured to support the network device in communicating with another network entity (for example, a network device in a core network). For example, in an LTE system, the communications unit 1004 may be an S1-U interface, configured to support the network device in communicating with a serving gateway (SGW); or the communications unit 1004 may be an S1-MME interface, configured to support the network device in communicating with a mobility management entity (MME).

Preferably, in this embodiment of the present invention, the network device 1000 includes a base station or an MME.

It may be understood that FIG. 10 shows only a simplified design of the network-side device 1000. In an actual application, the network-side device 1000 may include any quantity of transmitters, receivers, processors, controllers, memories, communications units, and the like, and all network devices that can implement this embodiment of the present invention shall fall within the protection scope of this embodiment of the present invention.

In this embodiment of the present invention, the network device 1000 determines at least one of N user equipment supporting a relay function, and the network device 1000 triggers only the determined at least one user equipment supporting the relay function to initiate a device-to-device discovery process. Therefore, unnecessary power consumption for initiating the discovery process by user equipment that supports the relay function but does not satisfy a discovery function requirement of remote user equipment is reduced.

Further, some of the N user equipment supporting the relay function are first determined. Therefore, when a discovery requirement of the remote user equipment is notified during execution of the discovery process, resource consumption in a notification process can be reduced, and a process of mutual discovery by the remote user equipment and the user equipment supporting the relay function can be accelerated. For example, when a carrier frequency intended for discovery is notified to the user equipment supporting the relay function, the user equipment supporting the relay function may send or receive a discovery message only on the carrier frequency without trying a plurality of carrier frequencies.

Figure 11:
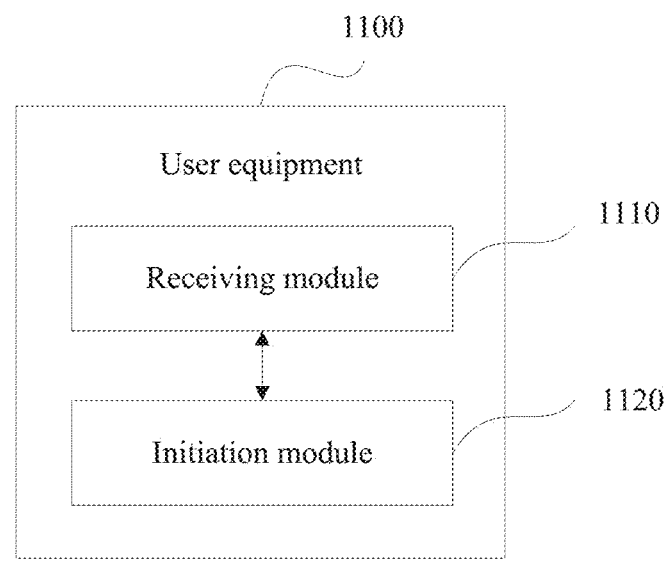
FIG. 11 is a schematic structural diagram of user equipment according to an embodiment of the present invention.

FIG. 11 is a schematic structural diagram of user equipment according to an embodiment of the present invention. As shown in FIG. 11, the user equipment 1100 includes:

a receiving module 1110, configured to receive a first notification message sent by a network device, where the first notification message is used to trigger at least one user equipment supporting a relay function to initiate a device-to-device discovery process, the at least one user equipment supporting the relay function is determined by the network device from N user equipment supporting the relay function, and the user equipment supports the relay function; and an initiation module 1120, configured to initiate the discovery process based on the first notification message.

Optionally, if the first notification message includes a paging message, the initiation module 1120 is specifically configured to:

receive the paging message at a preset monitoring time; and if the first notification message includes a user equipment identity of the user equipment, initiate, by the user equipment, the discovery process based on the first notification message.

In this embodiment of the present invention, the network device determines at least one of the N user equipment 1100 supporting the relay function, and the network device triggers only the determined at least one user equipment 1100 supporting the relay function to initiate the device-to-device discovery process. Therefore, unnecessary power consumption for initiating the discovery process by user equipment 1100 that supports the relay function but does not satisfy a discovery function requirement of remote user equipment is reduced.

Further, some of the N user equipment 1100 supporting the relay function are first determined. Therefore, when a discovery requirement of the remote user equipment is notified during execution of the discovery process, resource consumption in a notification process can be reduced, and a process of mutual discovery by the remote user equipment and the user equipment supporting the relay function can be accelerated. For example, when a carrier frequency intended for discovery is notified to the user equipment supporting the relay function, the user equipment supporting the relay function may send or receive a discovery message only on the carrier frequency without trying a plurality of carrier frequencies.

In this embodiment, the user equipment 1100 is presented in a form of a unit. Herein the "unit" may be an application-specific integrated circuit (ASIC), a processor and a memory for executing one or more software or firmware programs, an integrated logic circuit, and/or other components that can provide the foregoing functions.

It may be understood that, functions of each functional unit of the user equipment 1100 in this embodiment may be specifically implemented according to the method in the foregoing method embodiment. For a specific implementation process thereof, refer to the related description in the foregoing method embodiment. Details are not described again herein.

Figure 12:
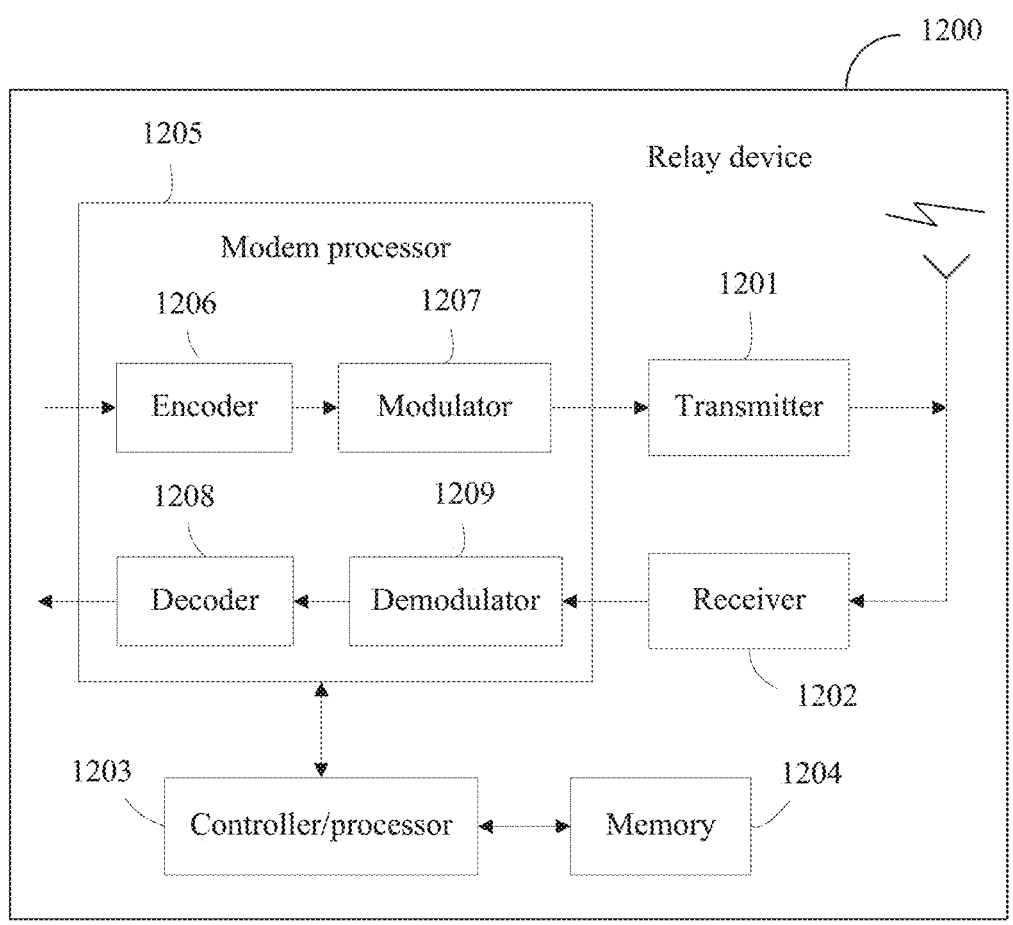
FIG. 12 is a schematic structural diagram of another user equipment according to an embodiment of the present invention.

FIG. 12 is a schematic structural diagram of another user equipment according to an embodiment of the present invention. As shown in FIG. 12, the user equipment 1200 includes:

a transmitter 1201, a receiver 1202, and a processor 1203. The processor 1203 may also be a controller, and is denoted as "controller/processor 1203" in FIG. 12. Optionally, the user equipment 1200 may further include a modem processor 1205, where the modem processor 1205 may include an encoder 1206, a modulator 1207, a decoder 1208, and a demodulator 1205.

In an example, the transmitter 1201 adjusts (for example, performs analog conversion, filtering, amplification, and up-conversion) the output sample and generates an uplink signal, where the uplink signal is transmitted to the base station in the foregoing embodiment by using an antenna. On a downlink, a downlink signal transmitted by the base station in the foregoing embodiment is received by using the antenna. The receiver 1202 adjusts (for example, performs filtering, amplification, down-conversion, and digitization) the signal received from the antenna and provides an input sample. In the modem processor 1205, the encoder 1206 receives service data and a signaling message to be sent on an uplink, and performs processing (for example, formatting, encoding, and interleaving) on the service data and signaling message. The modulator 1207 further processes (for example, performs symbol mapping and modulation) the encoded service data and signaling message and provides an output sample. The demodulator 1209 processes (for example, demodulates) the input sample and provides a symbol estimation. The decoder 1208 processes (for example, de-interleaves and decodes) the symbol estimation and provides data and a signaling message that are decoded and sent to the user equipment 1200. The encoder 1206, the modulator 1207, the demodulator 1209, and the decoder 1208 may be implemented by the composite modem processor 1205. The units perform processing based on a radio access technology (for example, access technologies of LTE and other evolved systems) used by a radio access network. It should be noted that, when the user equipment 1200 does not include the modem processor 1205, the foregoing function of the modem processor 1205 may also be implemented by the processor 1203.

The processor 1203 controls and manages actions of the user equipment 1200, and is configured to perform a processing procedure performed by the user equipment 1200 in the foregoing embodiment of the present invention. For example, the processor 1203 is further configured to perform corresponding steps in the foregoing method embodiment, and/or another process in the technical solution described in this application.

Further, the user equipment 1200 may further include a memory 1204, where the memory 1204 is configured to store program code and data of the user equipment 1200.

In this embodiment of the present invention, a network device determines at least one user equipment 1200 supporting a relay function in N user equipment 1100 supporting the relay function, and the network device triggers only the determined at least one user equipment 1200 supporting the relay function to initiate a device-to-device discovery process. Therefore, unnecessary power consumption for initiating the discovery process by user equipment 1100 that supports the relay function but does not satisfy a discovery function requirement of remote user equipment is reduced.

Further, some of the N user equipment 1200 supporting the relay function are first determined. Therefore, when a discovery requirement of the remote user equipment is notified during execution of the discovery process, resource consumption in a notification process can be reduced, and a process of mutual discovery by the remote user equipment and the user equipment supporting the relay function can be accelerated. For example, when a carrier frequency intended for discovery is notified to the user equipment supporting the relay function, the user equipment supporting the relay function may send or receive a discovery message only on the carrier frequency without trying a plurality of carrier frequencies.

Figure 13:
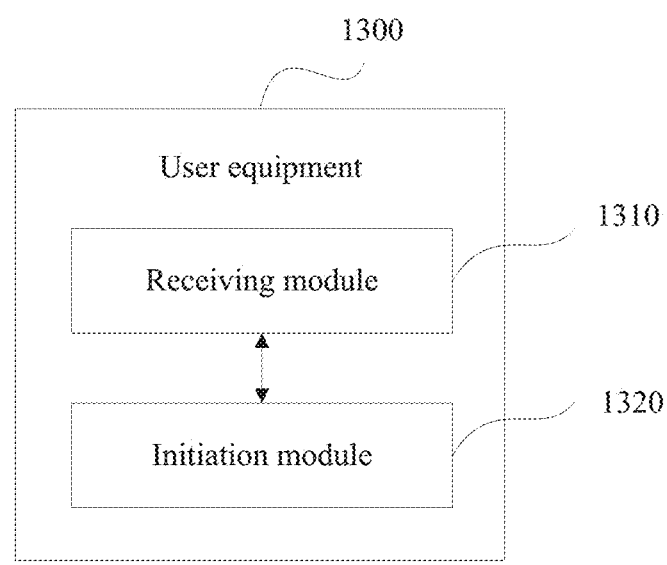
FIG. 13 is a schematic structural diagram of user equipment according to an embodiment of the present invention.

FIG. 13 is a schematic structural diagram of user equipment according to an embodiment of the present invention. As shown in FIG. 13, the user equipment 1300 includes:

a receiving module 1310, configured to receive a notification message sent by a network device, where the user equipment supports a relay function, the notification message is used to trigger the user equipment to initiate a device-to-device discovery process, and the notification message includes a communication parameter set for initiating the device-to-device discovery process by the user equipment; and an initiation module 1320, configured to initiate, by the user equipment, the device-to-device discovery process if a relay function parameter set of the user equipment and the communication parameter set satisfy a preset matching relationship.

Optionally, the network device includes a base station.

Optionally, the communication parameter set includes at least one of the following parameters:

instruction information used to initiate the discovery process, the device-to-device connection access mode, a public land mobile network (PLMN) identity in the discovery process, a carrier frequency for sending and/or receiving a discovery message in the discovery process, a discovery mechanism of the discovery process, and a sending and/or receiving resource pool used for sending and/or receiving the discovery message in the discovery process.

Optionally, the relay function parameter set includes at least one of the following parameters:

a remote user equipment association identifier supported by the user equipment supporting the relay function, a device-to-device connection access mode supported by the user equipment supporting the relay function, a public land mobile network (PLMN) identity supported by the user equipment supporting the relay function, a carrier frequency supported by the user equipment supporting the relay function, and a discovery mechanism of the device-to-device discovery process that is supported by the user equipment supporting the relay function.

Optionally, the notification message includes a paging message; and if the relay function parameter set of the user equipment and the communication parameter set satisfy the preset matching relationship, before the user equipment initiates the device-to-device discovery process, the receiving module 1310 is further configured to receive the paging message at a preset monitoring time.

In this embodiment of the present invention, when the relay function parameter set of the user equipment 1300 supporting the relay function and the communication parameter set for initiating the device-to-device discovery process by the user equipment satisfy the preset matching relationship, the user equipment 1300 initiates the discovery process. Therefore, unnecessary power consumption for initiating the discovery process by user equipment 1300 that supports the relay function but does not satisfy a discovery function requirement of remote user equipment is reduced.

Further, only some user equipment 1300 supporting the relay function perform the discovery process. Therefore, when a discovery requirement of the remote user equipment is notified, resource consumption in a notification process can be reduced, and a process of mutual discovery by the remote user equipment and the user equipment 1300 supporting the relay function can be accelerated. For example, when a carrier frequency intended for discovery is notified to the user equipment supporting the relay function, the user equipment supporting the relay function may send or receive a discovery message only on the carrier frequency without trying a plurality of carrier frequencies.

In this embodiment, the user equipment 1300 is presented in a form of a unit. Herein the "unit" may be an application-specific integrated circuit (ASIC), a processor and a memory for executing one or more software or firmware programs, an integrated logic circuit, and/or other components that can provide the foregoing functions.

It may be understood that, functions of each functional unit of the user equipment 1300 in this embodiment may be specifically implemented according to the method in the foregoing method embodiment. For a specific implementation process thereof, refer to the related description in the foregoing method embodiment. Details are not described again herein.

Figure 14:
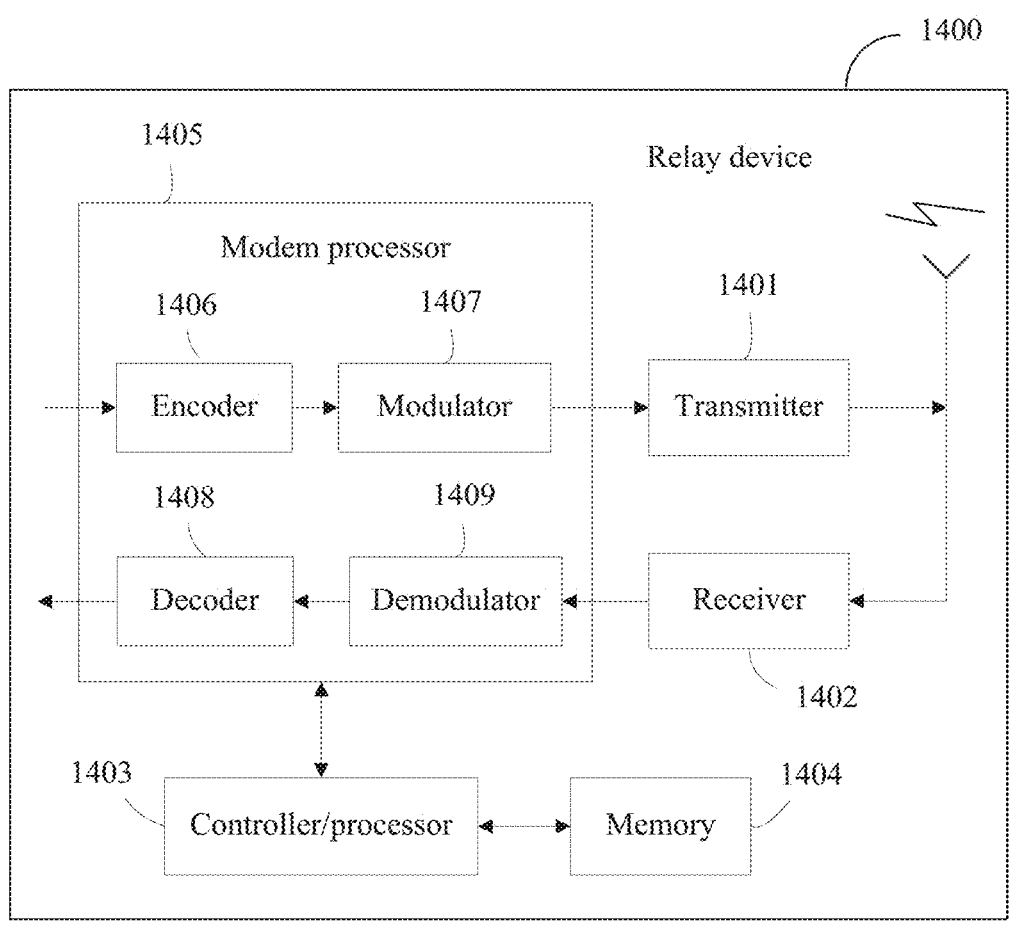
FIG. 14 is a schematic structural diagram of another user equipment according to an embodiment of the present invention.

FIG. 14 is a schematic structural diagram of another user equipment according to an embodiment of the present invention. As shown in FIG. 14, the user equipment 1400 includes:

a transmitter 1401, a receiver 1402, and a processor 1403. The processor 1403 may also be a controller, and is denoted as "controller/processor 1403" in FIG. 14. Optionally, the user equipment 1400 may further include a modem processor 1405, where the modem processor 1405 may include an encoder 1406, a modulator 1407, a decoder 1408, and a demodulator 1405.

In an example, the transmitter 1401 adjusts (for example, performs analog conversion, filtering, amplification, and up-conversion) the output sample and generates an uplink signal, where the uplink signal is transmitted to the base station in the foregoing embodiment by using an antenna. On a downlink, a downlink signal transmitted by the base station in the foregoing embodiment is received by using the antenna. The receiver 1402 adjusts (for example, performs filtering, amplification, down-conversion, and digitization) the signal received from the antenna and provides an input sample. In the modem processor 1405, the encoder 1406 receives service data and a signaling message to be sent on an uplink, and performs processing (for example, formatting, encoding, and interleaving) on the service data and signaling message. The modulator 1407 further processes (for example, performs symbol mapping and modulation) the encoded service data and signaling message and provides an output sample. The demodulator 1409 processes (for example, demodulates) the input sample and provides a symbol estimation. The decoder 1408 processes (for example, de-interleaves and decodes) the symbol estimation and provides data and a signaling message that are decoded and sent to the user equipment 1400. The encoder 1406, the modulator 1407, the demodulator 1409, and the decoder 1408 may be implemented by the composite modem processor 1405. The units perform processing based on a radio access technology (for example, access technologies of LTE and other evolved systems) used by a radio access network. It should be noted that, when the user equipment 1400 does not include the modem processor 1405, the foregoing function of the modem processor 1405 may also be implemented by the processor 1403.

The processor 1403 controls and manages actions of the user equipment 1400, and is configured to perform a processing procedure performed by the user equipment 1400 in the foregoing embodiment of the present invention. For example, the processor 1403 is further configured to perform corresponding steps in the foregoing method embodiment, and/or another process in the technical solution described in this application.

Further, the user equipment 1400 may further include a memory 1404, where the memory 1404 is configured to store program code and data of the user equipment 1400.

In this embodiment of the present invention, a network device determines at least one of N user equipment 1400 supporting a relay function, and the network device triggers only the determined at least one user equipment 1400 supporting the relay function to initiate a device-to-device discovery process. Therefore, unnecessary power consumption for initiating the discovery process by user equipment 1100 that supports the relay function but does not satisfy a discovery function requirement of remote user equipment is reduced.

Further, some of the N user equipment 1400 supporting the relay function are first determined. Therefore, when a discovery requirement of the remote user equipment is notified during execution of the discovery process, resource consumption in a notification process can be reduced, and a process of mutual discovery by the remote user equipment and the user equipment supporting the relay function can be accelerated. For example, when a carrier frequency intended for discovery is notified to the user equipment supporting the relay function, the user equipment supporting the relay function may send or receive a discovery message only on the carrier frequency without trying a plurality of carrier frequencies.

Figure 15:
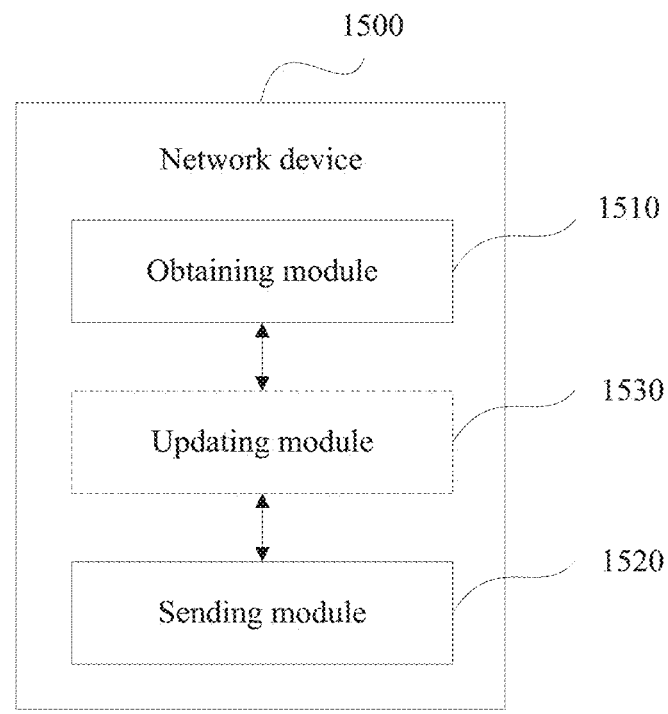
FIG. 15 is a schematic structural diagram of a network device according to an embodiment of the present invention.

FIG. 15 is a schematic structural diagram of a network device according to an embodiment of the present invention. As shown in FIG. 15, the network device 1500 includes:

an obtaining module 1510, configured to obtain a second relay function parameter set of remote user equipment; and a sending module 1520, configured to send a notification message to user equipment, where the user equipment supports a relay function, the notification message is used to trigger the user equipment to initiate a device-to-device discovery process, the notification message includes a communication parameter set for initiating the device-to-device discovery process by the user equipment, and the communication parameter set is determined based on the second relay function parameter set.

Optionally, the network device 1500 includes a base station.

Optionally, the obtaining module 1510 is further configured to obtain a third relay function parameter set of the remote user equipment; and the network device 1500 further includes an updating module 1530, configured to incorporate the third relay function parameter set into the second relay function parameter set to update the second relay function parameter set and obtain a new second relay function parameter set, where a first relay function parameter set of the at least one user equipment supporting the relay function includes the new second relay function parameter set.

Optionally, the communication parameter set includes at least one of the following parameters:

instruction information used to initiate the discovery process, the device-to-device connection access mode, a public land mobile network (PLMN) identity in the discovery process, a carrier frequency for sending and/or receiving a discovery message in the discovery process, a discovery mechanism of the discovery process, and a sending and/or receiving resource pool used for sending and/or receiving the discovery message in the discovery process.

Optionally, the notification message includes a paging message.

In this embodiment of the present invention, when a relay function parameter set of the user equipment supporting the relay function and the communication parameter set for initiating the device-to-device discovery process by the user equipment satisfy a preset matching relationship, the user equipment initiates the discovery process. Therefore, unnecessary power consumption for initiating the discovery process by user equipment that supports the relay function but does not satisfy a discovery function requirement of the remote user equipment is reduced.

Further, only some user equipment supporting the relay function perform the discovery process. Therefore, when a discovery requirement of the remote user equipment is notified, resource consumption in a notification process can be reduced, and a process of mutual discovery by the remote user equipment and the user equipment supporting the relay function can be accelerated. For example, when a carrier frequency intended for discovery is notified to the user equipment supporting the relay function, the user equipment supporting the relay function may send or receive a discovery message only on the carrier frequency without trying a plurality of carrier frequencies.

In this embodiment, the network device 1500 is presented in a form of a unit. Herein the "unit" may be an application-specific integrated circuit (ASIC), a processor and a memory for executing one or more software or firmware programs, an integrated logic circuit, and/or other components that can provide the foregoing functions.

It may be understood that, functions of each functional unit of the network device 1500 in this embodiment may be specifically implemented according to the method in the foregoing method embodiment. For a specific implementation process thereof, refer to the related description in the foregoing method embodiment. Details are not described again herein.

Figure 16:
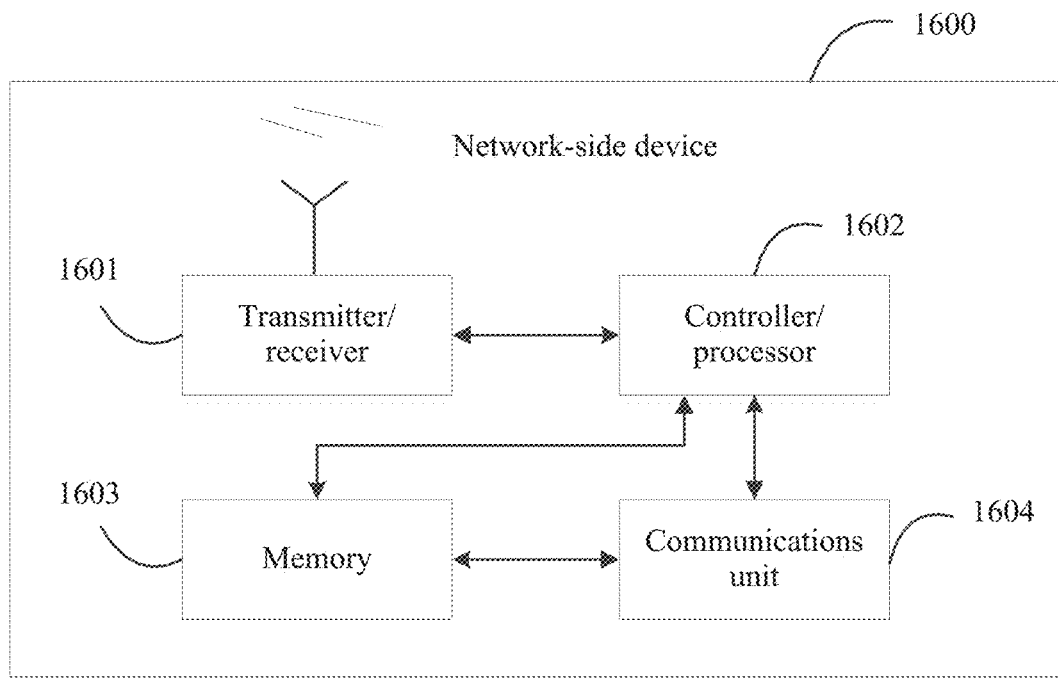
FIG. 16 is a schematic structural diagram of another network device according to an embodiment of the present invention.

FIG. 16 is a schematic structural diagram of another network device according to an embodiment of the present invention. As shown in FIG. 16, the network device 1600 includes:

a transmitter/receiver 1601 and a processor 1602. The processor 1602 may also be a controller, and is denoted as "controller/processor 1602" in FIG. 16. The transmitter/receiver 1601 is configured to support the network-side device in sending information to or receiving information from the terminal in the foregoing embodiment, and support the terminal in performing radio communication with another terminal. The processor 1602 performs various functions used to communicate with the terminal. On an uplink, an uplink signal from the terminal is received by an antenna, demodulated (for example, a high frequency signal is demodulated into a baseband signal) by the receiver 1601, and further processed by the processor 1602, so that service data and signaling information sent by the terminal are restored. On a downlink, service data and a signaling message are processed by the processor 1602, and modulated (for example, a baseband signal is modulated into a high frequency signal) by the transmitter 1601, so that a downlink signal is generated and transmitted to the user equipment by using the antenna. It should be noted that, the demodulation or modulation function may also be implemented by the processor 1602. For example, the processor 1602 is further configured to perform corresponding steps in the foregoing method embodiment, and/or another process in the technical solution described in this embodiment of the present invention.

Further, the network device 1600 may further include a memory 1603, where the memory 1603 is configured to store program code and data of the network device 1600. In addition, the network device 1600 may further include a communications unit 1604. The communications unit 1604 is configured to support the network device in communicating with another network entity (for example, a network device in a core network). For example, in an LTE system, the communications unit 1604 may be an S1-U interface, configured to support the network device in communicating with a serving gateway (SGW); or the communications unit 1604 may be an S1-MME interface, configured to support the network device in communicating with a mobility management entity (MME).

Preferably, in this embodiment of the present invention, the network device 1600 includes a base station or an MME.

It may be understood that FIG. 16 shows only a simplified design of the network-side device 1600. In an actual application, the network-side device 1600 may include any quantity of transmitters, receivers, processors, controllers, memories, communications units, and the like, and all network devices that can implement this embodiment of the present invention shall fall within the protection scope of this embodiment of the present invention.

In this embodiment of the present invention, the network device 1600 determines at least one of N user equipment supporting a relay function, and the network device 1600 triggers only the determined at least one user equipment supporting the relay function to initiate a device-to-device discovery process. Therefore, unnecessary power consumption for initiating the discovery process by user equipment that supports the relay function but does not satisfy a discovery function requirement of remote user equipment is reduced.

Further, some of the N user equipment supporting the relay function are first determined. Therefore, when a discovery requirement of the remote user equipment is notified during execution of the discovery process, resource consumption in a notification process can be reduced, and a process of mutual discovery by the remote user equipment and the user equipment supporting the relay function can be accelerated. For example, when a carrier frequency intended for discovery is notified to the user equipment supporting the relay function, the user equipment supporting the relay function may send or receive a discovery message only on the carrier frequency without trying a plurality of carrier frequencies.

An embodiment of the present invention further provides a computer storage medium, where the computer storage medium may store a program. When being executed, the program performs some or all steps of the method for controlling device-to-device discovery described in the foregoing method embodiment.

It should be noted that, to make the description brief, the foregoing method embodiments are expressed as a series of actions. However, persons skilled in the art should appreciate that the present invention is not limited to the described action sequence, because according to the present invention, some steps may be performed in other sequences or performed simultaneously. In addition, persons skilled in the art should also appreciate that all the embodiments described in the specification are embodiments as an example, and the related actions and modules are not necessarily mandatory to the present invention.

In the foregoing embodiments, the descriptions of the embodiments have respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in the embodiments of the present invention. The foregoing storage medium includes any medium that can store program code, such as a USB flash drive, a read-only memory (ROM, Read-Only Memory), a random access memory (RAM), a removable hard disk, a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for controlling device-to-device discovery, wherein the method comprises:
    obtaining, by a network device, N first relay function parameter sets of N user equipment supporting a relay function, wherein N is a positive integer;
    obtaining, by the network device, a second relay function parameter set of a remote user equipment;
    obtaining, by the network device, a third relay function parameter set of the remote user equipment;
    incorporating, by the network device, the third relay function parameter set into the second relay function parameter set to update the second relay function parameter set to obtain a new second relay function parameter set, wherein the N first relay function parameter sets comprise the new second relay function parameter set;
    determining, by the network device for the remote user equipment, at least one of the N user equipment supporting the relay function parameter sets, wherein the N first relay function parameter sets of the at least one of the N user equipment supporting the relay function parameter sets and the new second relay function parameter set satisfy a preset matching relationship; and
    sending, by the network device, a first notification message to the at least one of the N user equipment supporting the relay function parameter sets, wherein the first notification message triggers the at least one of the N user equipment supporting the relay function parameter sets to initiate the device-to-device discovery.

2. The method of claim 1, wherein the network device comprises a base station, wherein obtaining the N first relay function parameter sets comprises receiving, by the base station, a second notification message from a mobility management entity (MME), wherein the second notification message comprises the N first relay function parameter sets and user equipment identities of the N user equipment supporting the N first relay function parameter sets.

3. The method of claim 1, wherein the network device comprises a base station, and wherein obtaining the N first relay function parameter sets of the N user equipment supporting the N first relay function parameter sets comprises:

sending, by the base station, a first request message to a mobility management entity (MME), wherein the first request message comprises the second relay function parameter set; and
receiving a first request feedback message from the MME in response to the first request message, wherein the first request feedback message comprises the N first relay function parameter sets and user identities of the N user equipment supporting the N first relay function parameter sets.

4. The method of claim 1, wherein obtaining the second relay function parameter set comprises obtaining, by the network device, the second relay function parameter set of the remote user equipment from the remote user equipment.

5. The method of claim 1, wherein the network device comprises a base station, wherein obtaining the second relay function parameter set comprises receiving, by the base station, a second request message from the remote user equipment, and wherein the second request message comprises the second relay function parameter set.

6. The method of claim 1, wherein the network device comprises a mobility management entity (MME), wherein obtaining, by the MME, the second relay function parameter set comprises receiving, by the MME, a third request message from the remote user equipment, and wherein the third request message comprises the second relay function parameter set.

7. The method of claim 1, wherein the first relay function parameter set comprises at least one of the following relay function parameters: a remote user equipment association identifier supported by the at least one of the N user equipment supporting the N first relay function parameter sets, a device-to-device connection access mode supported by the at least one of the N user equipment supporting the N first relay function parameter sets, or a discovery mechanism that is supported by the at least one of the N user equipment supporting the N first relay function parameter sets.

8. The method of claim 1, wherein the second relay function parameter set comprises at least one of the following relay function parameters: a remote user equipment association identifier supported by the at least one of the N user equipment supporting the N first relay function parameter sets, a device-to-device connection access mode currently selected by the remote user equipment supporting the N first relay function parameter sets, or a discovery mechanism that is selected by the remote user equipment supporting the N first relay function parameter sets.

9. The method of claim 1, wherein the third relay function parameter set comprises at least one of the following function parameters: a public land mobile network (PLMN) identity currently selected by the remote user equipment or a current serving frequency of the remote user equipment supporting the N first relay function parameter sets.

10. The method of claim 1, wherein the first notification message comprises at least one of the following parameters: instruction information used to initiate the device-to-device discovery, a device-to-device connection access mode, a carrier frequency for communicating a discovery message in the device-to-device discovery, a discovery mechanism of the device-to-device discovery, or a communication resource pool used for communicating the discovery message in the device-to-device discovery.

11. The method of claim 10, wherein after the network device determines that one of the at least one of the N user equipment supporting the N first relay function parameter sets is connected to the remote user equipment, the method further comprises sending, by the network device, a fourth notification message to another user equipment supporting the N first relay function parameter sets, wherein the other user equipment is different from the at least one of the N user equipment supporting the N first relay function parameter sets, and wherein the fourth notification message instructs the other user equipment to stop the device-to-device discovery process.

12. The method of claim 11, wherein the fourth notification message comprises at least one of the following parameters: a remote user equipment association identifier supported by the at least one of the N user equipment supporting the N first relay function parameter sets or instruction information used to stop the device-to-device discovery process.

13. The method of claim 11, wherein the at least one of the N user equipment supporting the N first relay function parameter sets is in a connected state, wherein the first notification message is a dedicated control message, and wherein the fourth notification message comprises the dedicated control message.

14. The method of claim 11, wherein the at least one of the N user equipment supporting the N first relay function parameter sets is in an idle state or a connected state, wherein the first notification message is a paging message, and wherein the fourth notification message comprises the paging message.

15. The method of claim 14, wherein when the first notification message is the paging message, and wherein the first notification message further comprises a user equipment identity of the at least one of the N user equipment supporting the N first relay function parameter sets.

16. The method of claim 1, wherein the first notification message comprises a time identifier, and wherein the time identifier instructs the at least one of the N user equipment supporting the N first relay function parameter sets to stop the device-to-device discovery after a preset time period corresponding to the time identifier elapses after the first notification message is received.

17. A method for controlling device-to-device discovery, wherein the method comprises:
obtaining, by a mobility management entity (MME), N first relay function parameter sets of N user equipment supporting a relay function, wherein N is a positive integer;
obtaining, by the MME, a second relay function parameter set of a remote user equipment;
obtaining, by the MME, a third relay function parameter set of the remote user equipment;
incorporating, by the MME, the third relay function parameter set into the second relay function parameter set to update the second relay function parameter set to obtain a new second relay function parameter set, wherein the N first relay function parameter sets comprise the new second relay function parameter set;
determining, by the MME for the remote user equipment, at least one of the N user equipment supporting the N first relay function parameter sets, wherein the N first relay function parameter sets of the at least one of the N user equipment supporting the N first relay function parameter sets and the new second relay function parameter set satisfy a preset matching relationship; and
sending, by the MME, a third notification message instructing a base station to send a first notification message to the at least one of the N user equipment supporting the N first relay function parameter sets, wherein the first notification message triggers the at least one of the N user equipment to initiate the device-to-device discovery.

18. The method of claim 17, wherein the third notification message comprises at least one of the following parameters: a user equipment identity of the at least one of the N user equipment supporting the N first relay function parameter sets, instruction information used to initiate the device-to-device discovery, a device-to-device connection access mode, a carrier frequency for communicating a discovery message in the device-to-device discovery, a discovery mechanism of the device-to-device discovery, or a communication resource pool used for communicating the discovery message in the device-to-device discovery.

19. A method for controlling device-to-device discovery, wherein the method comprises:
obtaining, by a mobility management entity (MME), N first relay function parameter sets of N user equipment supporting a relay function, wherein N is a positive integer;
obtaining, by the MME, a Non Access Stratum (NAS) message, wherein the NAS message comprises a second relay function parameter set of a remote user equipment;
determining, by the MME for the remote user equipment, at least one of the N user equipment supporting the N first relay function parameter sets, wherein the N first relay function parameter sets of the at least one of the N user equipment supporting the N first relay function parameter sets and the second relay function parameter set satisfy a preset matching relationship; and
sending, by the MME, a first notification message to the at least one of the N user equipment supporting the N first relay function parameter sets wherein the first notification message triggers the at least one of the N user equipment supporting the N first relay function parameter sets to initiate the device-to-device discovery.

20. The method of claim 19, wherein the first notification message comprises at least one of the following parameters: instruction information used to initiate the device-to-device discovery, a device-to-device connection access mode, a carrier frequency for communicating a discovery message in the device-to-device discovery, a discovery mechanism of the device-to-device discovery, or a communication resource pool used for communicating the discovery message in the device-to-device discovery.

* * * * *

UNITED STATES PATENT AND TRADEMARK OFFICE
CERTIFICATE OF CORRECTION

PATENT NO. : 10,708,754 B2
APPLICATION NO. : 16/343237
DATED : July 7, 2020
INVENTOR(S) : Haibo Xu et al.

Page 1 of 1

It is certified that error appears in the above-identified patent and that said Letters Patent is hereby corrected as shown below:

In the Claims

Claim 1, Column 41, Line 38: "sets comprise the new" should read "set comprises the new"

Claim 1, Column 41, Line 43: "function parameter sets" should read "function parameter set"

Claim 7, Column 42, Line 35: "N first relay function" should read "relay function"

Claim 14, Column 43, Line 23: "the N first relay function" should read "the first N relay function"

Claim 17, Column 43, Line 54 and 55: "sets comprise the new" should read "sets comprises the new"

Signed and Sealed this
Twenty-fifth Day of August, 2020

Andrei Iancu
*Director of the United States Patent and Trademark Office*